US007228369B2

(12) United States Patent
Nakamura

(10) Patent No.: US 7,228,369 B2
(45) Date of Patent: Jun. 5, 2007

(54) CLUSTERED STORAGE SYSTEM AND INTER-CLUSTER DATA COMMUNICATION METHOD

(75) Inventor: Shuji Nakamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 10/944,851

(22) Filed: Sep. 21, 2004

(65) Prior Publication Data
US 2006/0004796 A1 Jan. 5, 2006

(30) Foreign Application Priority Data
Jul. 2, 2004 (JP) ............................. 2004-197259

(51) Int. Cl.
*G06F 3/00* (2006.01)
*G06F 15/173* (2006.01)
(52) U.S. Cl. .............................. 710/38; 710/5; 710/15; 709/238; 709/239
(58) Field of Classification Search ................ 710/36, 710/37, 38; 709/238, 239
See application file for complete search history.

(56) References Cited
U.S. PATENT DOCUMENTS

| 4,958,273 | A | * | 9/1990 | Anderson et al. ............. 712/29 |
| 5,452,421 | A | * | 9/1995 | Beardsley et al. .............. 714/4 |
| 6,006,300 | A | * | 12/1999 | Toutant ....................... 710/314 |
| 6,240,467 | B1 | * | 5/2001 | Beardsley et al. .............. 710/5 |
| 6,542,961 | B1 | | 4/2003 | Matsunami et al. |
| 6,647,461 | B2 | | 11/2003 | Fujimoto et al. |
| 6,850,997 | B1 | * | 2/2005 | Rooney et al. ................ 710/38 |
| 2003/0093627 | A1 | * | 5/2003 | Neal et al. ................... 711/153 |
| 2004/0181639 | A1 | * | 9/2004 | Jarvis et al. ................. 711/161 |
| 2005/0013319 | A1 | * | 1/2005 | Kenkare ...................... 370/463 |
| 2005/0193240 | A1 | | 9/2005 | Ash et al. |
| 2005/0235092 | A1 | * | 10/2005 | Ballew et al. ............... 710/316 |

\* cited by examiner

*Primary Examiner*—Kim Huynh
*Assistant Examiner*—Alan S. Chen
(74) *Attorney, Agent, or Firm*—Antonelli, Terry, Stout & Kraus, LLP.

(57) ABSTRACT

Plural clusters are interconnected by two full-duplex communication paths. When a cluster 10A receives a read request from a host computer 2, and data represented by the read request are stored in another cluster 10B, a processor unit 6 of the cluster 10A uses, for the path used by a control packet sent to the other cluster 10B, the same path used by a read user data packet that is a user data packet transferred from the other cluster 10B to the cluster 10A.

11 Claims, 20 Drawing Sheets

FIG. 8A

141: READ REQUEST PACKET

| PACKET TYPE: READ REQUEST | DATA LENGTH | SEQUENCE ID | REQUEST SOURCE ADDRESS | REQUEST DESTINATION ADDRESS |
|---|---|---|---|---|
| 131 | 132 | 133 | 134 | 135 |

FIG. 8B

142: READ REPLY PACKET

| PACKET TYPE: READ REPLY | DATA LENGTH | SEQUENCE ID | REPLY SOURCE ADDRESS | REPLY DESTINATION ADDRESS | DATA | STATUS |
|---|---|---|---|---|---|---|
| 131 | 132 | 133 | 136 | 137 | 138 | 139 |

FIG. 8C

143: WRITE REQUEST PACKET

| PACKET TYPE: WRITE REQUEST | DATA LENGTH | SEQUENCE ID | REQUEST SOURCE ADDRESS | REQUEST DESTINATION ADDRESS | DATA |
|---|---|---|---|---|---|
| 131 | 132 | 133 | 134 | 135 | 138 |

FIG. 8D

144: WRITE REPLY PACKET

| PACKET TYPE: WRITE REPLY | DATA LENGTH | SEQUENCE ID | REPLY SOURCE ADDRESS | REPLY DESTINATION ADDRESS | STATUS |
|---|---|---|---|---|---|
| 131 | 132 | 133 | 136 | 137 | 139 |

FIG. 10A

835: PATH SELECTION TABLE

| CONTROL REQUEST PACKET PATH NUMBER (835a) | CONTROL REPLY PACKET PATH NUMBER (835b) |
|---|---|
| 0 | 1 |
| 1 | 2 |
| ⋮ | ⋮ |
| m-1 | m |
| m | 0 |

FIG. 10B

644: CONFIGURATION REGISTER

| REQUEST DESTINATION (644a) | REQUEST PACKET ISSUANCE PATH NUMBER (644b) |
|---|---|
| WITHIN CLUSTER | RANDOM |
| CLUSTER #0 | 0 |
| ⋮ | ⋮ |
| CLUSTER #j-1 | 0 |
| CLUSTER #j | 1 |

CLUSTERED STORAGE SYSTEM AND INTER-CLUSTER DATA COMMUNICATION METHOD

CROSS-REFERENCE TO RELATED APPLICATION

This application relates to and claims priority from Japanese Patent Application No. 2004-197259, filed on Jul. 2, 2004, the entire disclosure of which is incorporated herein by reference.

BACKGROUND OF THE INVENTION

The present disclosure relates to a storage controller, where at least one storage device is disposed, and which is provided with plural clusters that control the at least one storage device, to an inter-cluster data communication method and to an inter-cluster communication control program.

The I/O performance of a disk subsystem, which is provided with a hard disk drive (abbreviated below as "HDD"), is three to four digits smaller in comparison to the I/O performance of the primary memory of a computer using a solid-state storage device for a storage medium, and efforts have conventionally been made to reduce this difference, i.e., to improve the I/O performance of the disk subsystem. As one method for improving the I/O performance of a disk subsystem, there is a known system called a disk array which is configured by plural HDDs and in which data is stored in the plural HDDs. In this storage system, an improved I/O performance, high reliability, high availability, and good scalability with respect to the numbers of connectable host computers and HDDs are demanded.

Usually, in order to obtain high reliability, operational checks are conducted during various steps of processing, failures are detected and data consistency is preserved. Also, in order to obtain high availability, HDDs and paths are made redundant. However, increasing the connectable numbers of host computers and HDDs per single disk controller provided for controlling the disk array in order to obtain high scalability leads to an increase in cost.

Thus, technology is known in which a disk controller, whose connectable number that can be realized at a low cost is limited, is used as one cluster and plural clusters are interconnected by an internal network to provide one large-scale disk subsystem. This disk controller is called a clustered disk controller. Such a clustered disk controller is described, for example, in U.S. Pat. No. 6,647,461.

Usually, in a clustered disk controller, the band of the path connecting the clusters is narrow in comparison to the band of the network within one cluster. The technology described in U.S. Pat. No. 6,647,461 provides a network that transfers data to be stored in a cache memory or in HDDs and a network that transfers data necessary to conduct control in the disk subsystem. Usually, the data size of the former data is relatively large, and a sufficient through-put performance to transfer a large amount of data is demanded for the data transfer, and the data size of the latter data is relatively small, and the response performance to end data transfer in a short amount of time is demanded for the data transfer. In the technology described in U.S. Pat. No. 6,647,461, because the networks are divided in relation to the inter-cluster paths, there are effects with respect to the through-put performance and the response performance in relation to data transfer between the clusters.

Below, a disk controller will also be called a storage controller, and a cluster of the disk controller will simply be called a cluster.

SUMMARY OF THE INVENTION

As described above, in the clustered storage controller described in U.S. Pat. No. 6,647,461, with respect to the path connecting the clusters, the path that transfers data stored in the HDD and the cache memory and a path that transfers data necessary for conducting control in the disk subsystem are provided separately. Thus, a balance in both an improvement of the through-put performance and an improvement of the response performance demanded of the respective data transfers is achieved. However, the manufacturing costs become relatively high as a result of providing dedicated paths with respect to each data transfer.

One embodiment for solving the above-stated problem provides a storage controller, where at least one storage device is disposed, and which is disposed with plural clusters that control the at least one storage device, wherein the plural clusters are interconnected by plural full-duplex communication paths, and when user data that is to be stored or is stored in the storage device is to be read or stored, assuming that a packet instructing the reading and writing of the user data, a packet representing the processing status of that instruction and a packet including the user data are used as user data packets, each cluster includes a first path selecting unit that selects a path used by the other packet with respect to a path used by one of the user data packet and a control packet, which is a packet necessary to control the transmission of the user data packet, so that the control packet is not transmitted by the same path in the same direction as the user data packet.

Here, in the storage controller, preferably, each of the plural clusters includes a communication control unit for communicating with external devices that are connected to the storage controller; and, when the communication control unit of one of the plural clusters receives a read request from an external device and data represented by the read request is being stored in the other cluster or the storage device disposed in the other cluster, the first path selecting unit of the one cluster selects, as the path used by the control packet to be sent to the other cluster, the same path as the path used by a read user data packet, that is a user data packet to be transferred from the other cluster to the one cluster. Also, when the communication control unit of one of the plural clusters receives a write request from an external device and the storage destination of data represented by the write request is a storage device disposed in the other cluster, the first path selecting unit of the one cluster preferably selects, as the path used by the control packet to be sent to the other cluster, a path that is different from the path used by a write user data packet, that is a user data packet to be transferred from the other cluster to the one cluster.

Moreover, in the storage controller, preferably each of the plural clusters includes a communication control unit for communicating with an external device and a request tendency grasping unit that grasps which of the read requests and write requests serving as requests from the external device is greater; and, in a case where the communication control unit of one of the plural clusters receives a read request from the external device and data represented by the read request is being stored in the other cluster or the storage device disposed in the other cluster, or a case where a write request is received from the external device and the storage destination of data represented by the write request is the storage device disposed in the other cluster, when the request tendency grasping unit of the one cluster grasps that there are more read requests as requests from the external device, the path selecting unit of the one cluster selects, as the path used by a control request packet to be sent to the other cluster, the same path as the path used by the user data packet, and when the request tendency grasping unit grasps that there are more write requests as requests from the external device, the path selecting unit of the one cluster selects, as the path used by the control request packet to be sent to the other cluster, a path that is different from the path used by the user data packet.

Also, another embodiment provides a storage controller, where at least one storage device is disposed, and which is disposed with plural clusters that control the at least one storage device, wherein the plural clusters are interconnected by plural full-duplex communication paths, and each cluster includes a first path selecting unit that selects a path used by the other packet with respect to a path used by one of the user data packets, which includes user data that is to be stored or is stored in the storage device, and control data necessary to control the transmission of the user data, so that the control packet is not transmitted by the same path in the same direction as the user data packets which include the user data.

Also, as an embodiment of an inter-cluster data communication method to be used in a storage device for solving the above-stated problem, in an inter-cluster data communication method in a storage system, where at least one storage device is disposed, and which is disposed with plural clusters that control the at least one storage device, the method includes interconnecting the plural clusters with plural full-duplex communication paths; and, when user data that is to be stored or is stored in the storage device is to be read or stored, assuming that a packet instructing the reading and writing of the user data, a packet representing the processing status of that instruction and a packet including the user data are used as user data packets, each cluster executes a first path selecting step that selects a path used by the other packet with respect to a path used by one of the user data packet and a control packet necessary to control the transmission of the user data packet, so that the control packet is not transmitted by the same path in the same direction as the user data packet.

Also, an embodiment of an inter-cluster communication program in a storage device for solving the above-stated problem is provided in a storage controller, where at least one storage device is disposed, and which is disposed with plural clusters that control the at least one storage device and in which the plural clusters are interconnected by plural full-duplex communication paths, wherein when user data that is to be stored or is stored in the storage device is to be read or stored, assuming that a packet instructing the reading and writing of the user data, a packet representing the processing status of that instruction and a packet including the user data are used as user data packets, the program causes a processor to execute a first path selecting step that selects a path used by the other packet with respect to a path used by one of the user data packet and a control packet necessary to control the transmission of the user data packet, so that the control packet is not transmitted by the same path in the same direction as the user data packet.

BRIEF DESCRIPTION OF THE DRAWINGS

FIG. 8A is a diagram showing an example of the format of a read request packet, FIG. 8B is a diagram showing an example of the format of a read reply packet, FIG. 8C is a diagram showing an example of the format of a write request packet, and FIG. 8D is a diagram showing an example of the format of a write reply packet;

FIG. 10A is a diagram showing an example of the configuration of a path selection table, and FIG. 10B is a diagram showing an example of the configuration of a configuration register;

DESCRIPTION OF THE PREFERRED EMBODIMENTS

An embodiment of a storage system will be described below with reference to the drawings.

Figure 1:
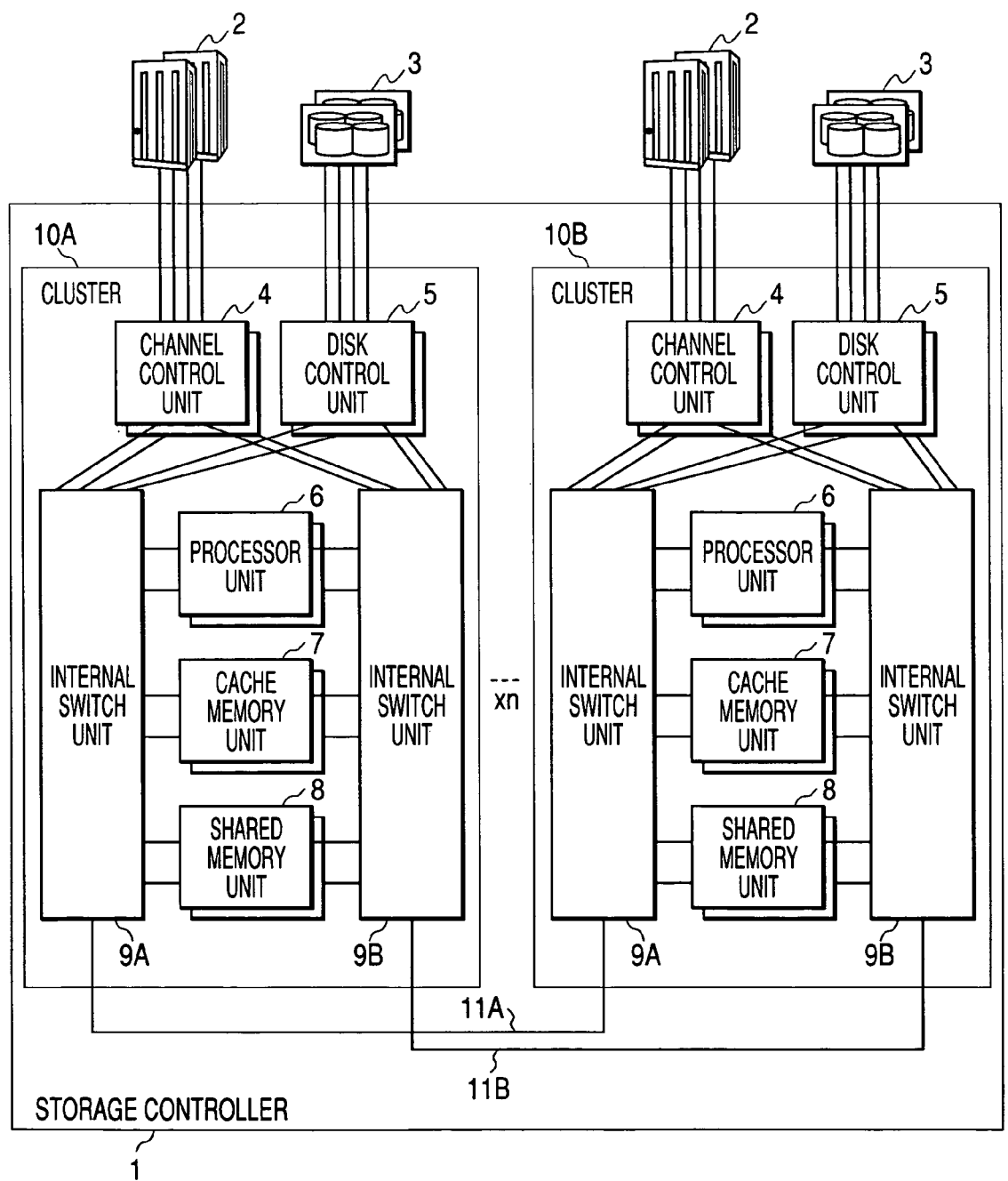
FIG. 1 is a block diagram showing an example of the configuration of an embodiment of a storage system.

As shown in FIG. 1, the storage system of the present embodiment is has a storage controller 1, which includes plural clusters 10A and 10B, and plural HDDs 3 are connected to the clusters 10A and 10B. Also, the storage system of the present embodiment is connected to host computers 2 via interfaces (also called "channels" below) that the clusters 10A and 10B have.

The storage controller 1 is connected to the host computers 2 via the channels and is similarly connected to the plural HDDs 3 via channels. For example, an SCSI (Small Computer System Interface) or a Fibre Channel is used as the channels. In particular, the storage controller 1 and the host computers 2 may also be connected via a SAN (Storage Area Network) constructed by a Fibre Channel.

Each of the clusters 10A and 10B of the storage controller 1 is provided with a channel control unit 4 that controls communication with the host computers 2, a disk control unit 5 that controls access with respect to the plural HDDs 3, a processor unit 6 that includes a processor, a cache memory unit 7 that includes a cache memory in which data to be stored to the HDDs 3 or data stored in the HDDs 3 is temporarily stored, a shared memory unit 8 that includes a shared memory in which cache directory information and logical volume configuration information is stored, and internal switch units 9A and 9B that interconnect the aforementioned units 4 through 8 and are connected to the other clusters.

The channel control units 4 of the clusters 10A and 10B are connected by the aforementioned channels to respective host computers 2, and the disk control units 5 of the clusters 10A and 10B are also connected by the aforementioned channels to respective ones of the plural HDDs 3. Below, when the storage controller 1 reads and writes data that is to be stored or that is stored in the HDDs 3 (user data), a packet that instructs each unit to read and write the user data in the storage controller 1 and a packet that includes the processing status (result) of that instruction's process and the user data will be referred to as user user data packets. Also, the transmission and reception of a user user data packets in the storage controller 1 will be referred to as a data access. A packet that exchanges, in the storage controller 1, information necessary to control each unit of the storage controller 1, such as data to be stored in the shared memory unit 8, will be referred to as a control packet, and the transmission and reception of a control packet will be referred to as a control access.

The plural clusters 10A and 10B are interconnected by two inter-cluster paths 11A and 11B. The clusters 10A and 10B communicate with each other using the inter-cluster paths 11A and 11B, whereby each cluster can access data stored in a HDD 3 that is not directly connected to that cluster itself, and it is possible to cause the host computers 2 to perceive the clusters as a single storage controller 1. In this manner, in the present embodiment, the clusters 10A and 10B are interconnected by the two inter-cluster paths 11A and 11B, and in each of the clusters 10A and 10B, there are the internal switch unit 9A that is connected to the inter-cluster path 11A and the internal switch unit 9B that is connected to the inter-cluster path 11B.

Figure 2:
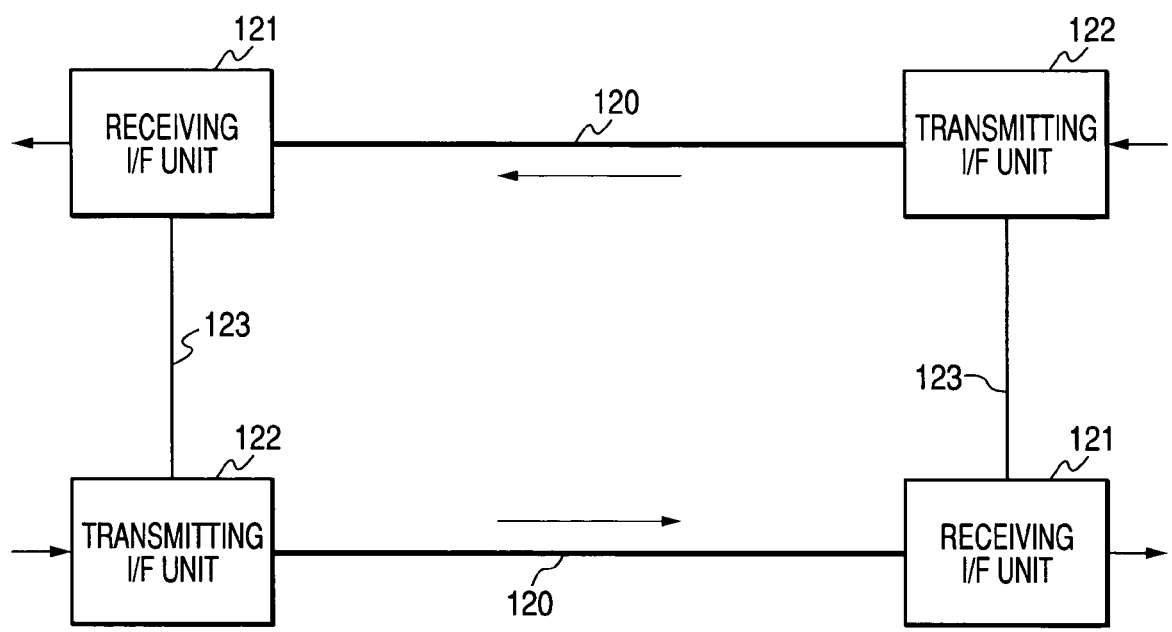
FIG. 2 is a block diagram showing an example of the configuration of paths in the embodiment.

As shown in FIG. 2, both of the inter-cluster paths 11A and 11B are full-duplex communication paths, and one path includes a pair of physical signal lines 120 whose communication directions are different. Here, the inter-cluster paths 11 are comprised by a pair of physical signal lines 120 whose transmission directions are different, but the inter-cluster paths 11 may be comprised by more pairs of physical signal lines 120 to expand the band. A transmitting I/F unit 122 is connected to the transmitting-end of each physical signal line 120, and a receiving I/F unit 121 is connected to the receiving-end of each physical signal line 120. The receiving I/F units 121 and the transmitting I/F units 122 are contained inside the internal switch units 9A and 9B and inside each of the units 4 through 8 of the clusters 10A and 10B. For example, when a packet is transferred from the processor unit 6 to the internal switch units 9A and 9B, a transmitting I/F unit 122, which receives a transmission request from a later-described packet forming unit 641 of the processor unit, adds, to a packet to be transmitted, additional information for guaranteeing communication between endpoints of the physical signal line 120, conducts coding (e.g., $8b/10b$ conversion) so that the packet can be transmitted by the physical signal line 120, and transmits the packet. When the physical signal line 120 is configured by optical fiber, the transmitting I/F unit 122 also conducts electrical/optical conversion. Conversely, at the receiving side, when the physical signal line 120 is configured by an optical fiber, the receiving I/F unit 121 conducts optical/electrical conversion and decoding, confirms that the packet has been properly received from the additional information, and forwards the packet to later-described address decoding units 94 of the internal switch units 9A and 9B.

In this case, the receiving I/F unit 121 instructs, using a notification-of-receipt signal line 123, the transmitting I/F unit 122 on the same side to transmit, to the packet source receiving I/F unit 121, a lower layer protocol packet, such as an acknowledge packet, for guaranteeing communication at both ends of the physical signal line 120 and a flow control packet. When the packet destination receiving I/F unit 121 receives the lower layer protocol packet, the receiving I/F unit 121 conducts transmission grant and transmission control of the next packet with respect to the transmitting I/F unit 122 on the same side in accordance with the content of the lower layer protocol packet (the protocol layer of the lower layer protocol packet is different from that of the packet for which a transmission request has been received from a prior stage and which is to be transmitted).

Figure 3:
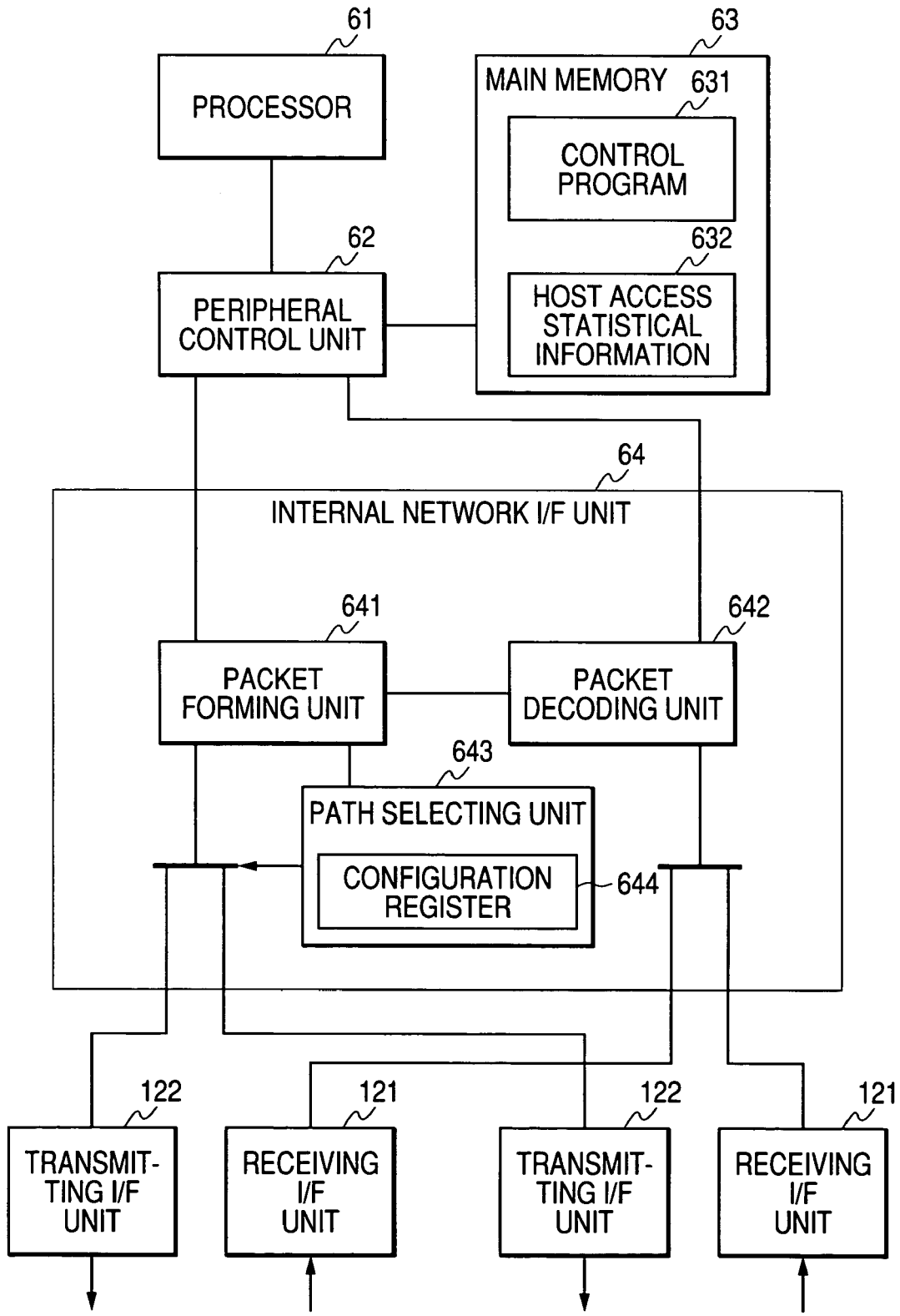
FIG. 3 is a block diagram showing an example of the configuration of a processor unit in the embodiment.

Next, the detailed configuration of the processor unit 6 will be described with reference to FIG. 3.

The processor unit 6 is provided with a processor 61 that executes various types of programs, a peripheral circuit unit 62 that includes circuits such as a memory controller and a bus conversion circuit, a main memory 63 in which various types of programs and data are stored, an internal network I/F unit 64 for communicating with the other units, and the aforementioned transmitting I/F units 122 and receiving I/F units 121.

The processor 61 is connected to the main memory 63 and the internal network I/F unit 64 via the peripheral circuit unit 62 and operates in accordance with a control program 631 stored in the main memory 63. Host access statistical information 632, which represents the kind of tendency of the I/O requests issued from the host computers 2 connected to the storage controller 1, is also stored in the main memory 63. The processor 61 counts the numbers of read requests and write requests from the host computers 2 and stores these as the host access statistical information 632 in the main memory 63. The host access statistical information 632 is not only simply the numbers of read requests and write requests, but may also be the results of constant statistical analysis, such as at what times there are many read requests and few write requests.

The internal network I/F unit 64 includes a packet forming unit 641 that forms packets, a packet decoding unit 642 that breaks down a received packet and decodes the content of the packets, and a path selecting unit 643 that selects which of the two inter-cluster paths 11A and 11B to use. The packet forming unit 641 forms a packet in accordance with a request from the processor 61, and it requests the transmitting I/F unit 122 to transmit the formed packet. At this time, the path selecting unit 643 selects the path by which the packet is to be sent in response to a packet request source and in accordance with the content of a configuration register 644 preset by the processor 61. The packet decoding unit 642 receives, via the receiving I/F unit 121, a reply packet from each unit with respect to the issued request packet, and it confirms the correspondence between the sequence ID of the request packet and the sequence ID of the reply packet. If the reply packet is a read reply packet, the packet decoding unit 642 sends data to be included in the read reply packet to the processor 61 via the peripheral circuit unit 62. The content of the configuration register 644 will be described later.

Figure 4:
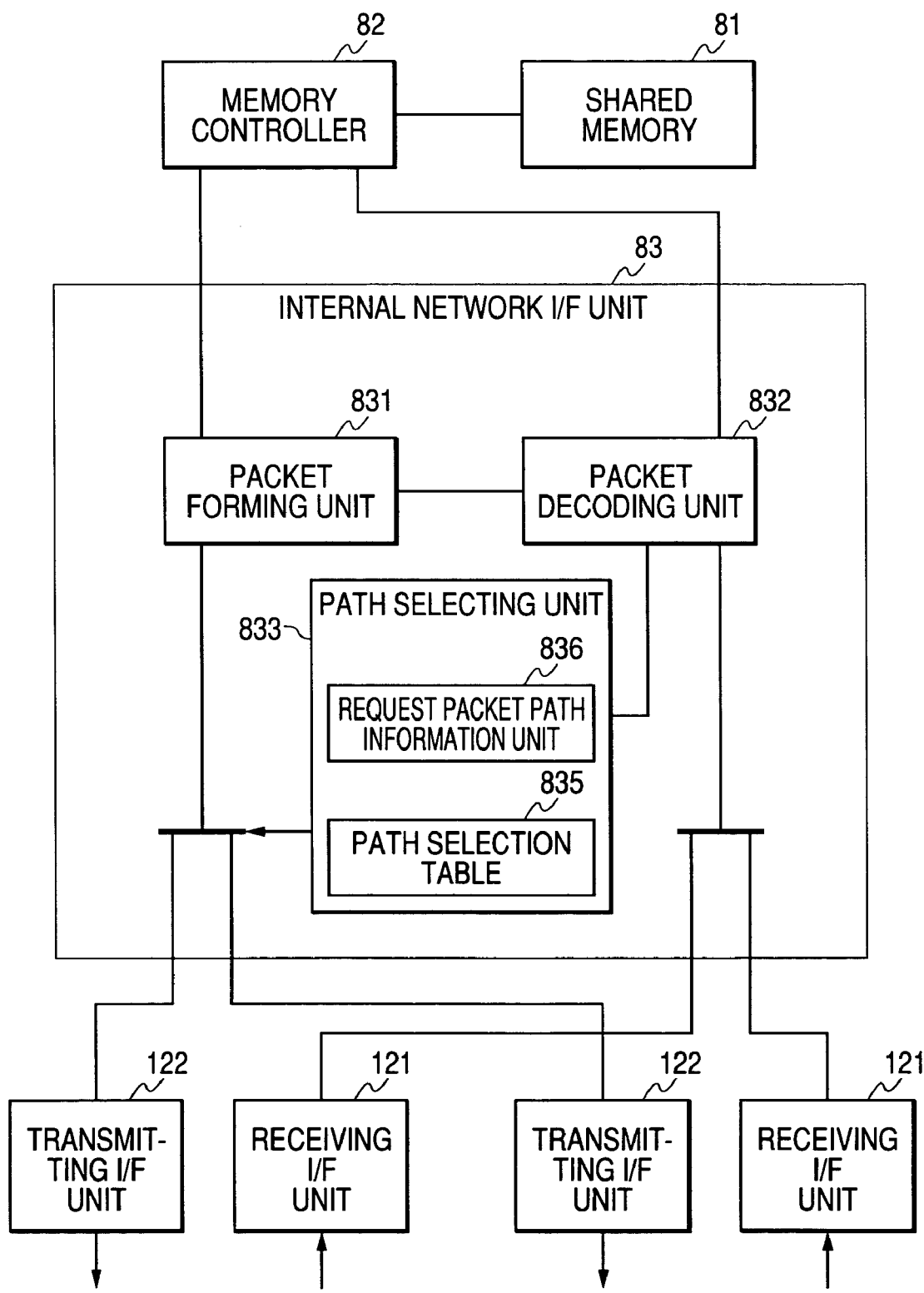
FIG. 4 is a block diagram showing an example of the configuration of a shared memory unit in the embodiment.

Next, the detailed configuration of the shared memory unit 8 will be described with reference FIG. 4.

The shared memory unit 8 is provided with a shared memory 81 in which cache memory directory information and logical volume configuration information is stored, a memory controller 82 that conducts access with respect to the shared memory 81, an internal network I/F unit 83 for communicating with the other units, and the aforementioned transmitting I/F units 122 and receiving I/F units 121.

The internal network I/F unit 83 includes a packet forming unit 831 that forms packets, a packet decoding unit 832 that decodes the content of the packets, and a path selecting unit 833 that selects which of the two paths to use for transmitting a packet.

Incidentally, the processor unit 6 and the shared memory unit 8 are different in that, whereas the processor unit 6 issues a request packet, the shared memory unit 8 issues a reply packet without issuing a request packet. Due to this difference, the structure of the internal network I/F unit 83—particularly the path selecting unit 833—is different from the path selecting unit 643. When the receiving I/F unit 121 receives a request packet and the packet decoding unit 832 receives the request packet, the packet decoding unit 832 writes, in a request packet path information unit 836 of the path selecting unit 833, the path number corresponding to the path used for the transfer of the received request packet, and it sends the request described in the request packet to the memory controller 82. The memory controller 82 processes this request, transmits data from the shared memory 81 to the packet forming unit 831, and requests the creation of a reply packet. The packet forming unit 831 forms a reply packet including data received from the memory controller 82 in accordance with the request from the memory controller 82. At the same time, the path selecting unit 833 references a later-described path selection table 835 and selects the path corresponding to the path number stored in the request packet path information unit 836. The packet forming unit 831 transmits the reply packet from the transmitting I/F unit 122 to the path that the path selecting unit 833 has selected.

Figure 5:
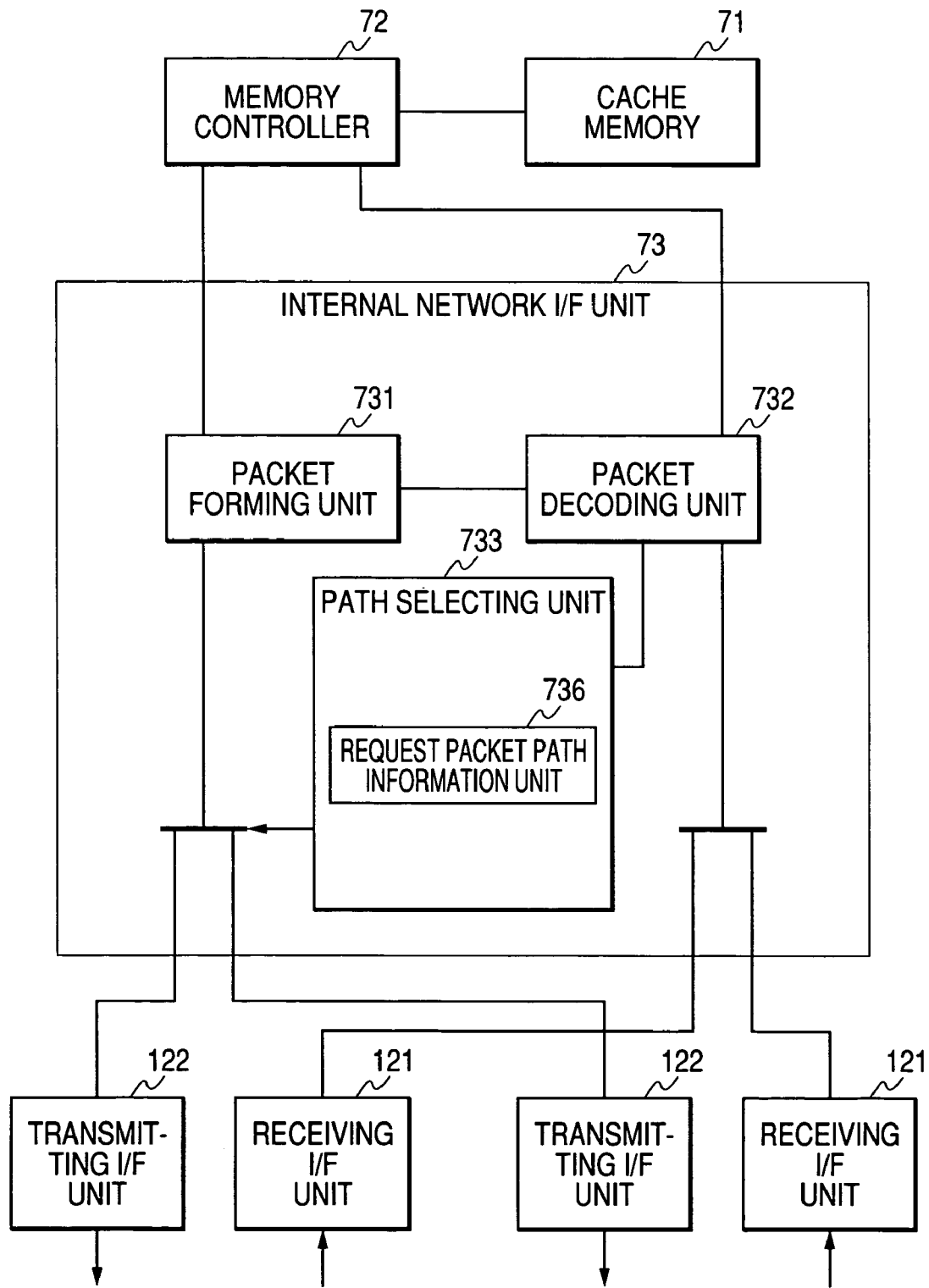
FIG. 5 is a block diagram showing an example of the configuration of a cache memory unit in the embodiment.

Next, the detailed configuration of the cache memory unit 7 will be described with reference to FIG. 5.

Basically similar to the aforementioned shared memory unit 8, the cache memory unit 7 is provided with a cache memory 71 that is present instead of the shared memory 81 of the shared memory unit 8, a memory controller 72 that conducts access with respect to the cache memory 81, an internal network I/F unit 73 for communicating with the other units, and the aforementioned transmitting I/F units 122 and receiving I/F units 121.

The internal network I/F unit 73 includes a packet forming unit 731 that forms packets, a packet decoding unit 732 that decodes the content of a packet, and a path selecting unit 733 that selects which of the paths to use in transmitting a packet. Whereas the path selecting unit 833 includes the request packet path information unit 836 and the path selection table 835, the path selecting unit 733 includes only a request packet path information unit 736. In the cache memory unit 7, when the receiving I/F unit 121 receives a request packet and the packet decoding unit 732 receives the request packet, the packet decoding unit 732 writes, in the request packet path information unit 736 of the path selecting unit 733, the path number corresponding to the path used for the transfer of the received request packet, and it sends the request described in the request packet to the memory controller 72. The memory controller 72 processes this request, transmits data from the cache memory 71 to the packet forming unit 731, and requests the creation of a reply packet. The packet forming unit 731 forms a reply packet including data received from the memory controller 72 in accordance with the request from the memory controller 72. At the same time, the path selecting unit 733 selects the path with the same path number as the path number stored in the request packet path information unit 736. The packet forming unit 831 transmits the reply packet from the transmitting I/F unit 122 to the path that the path selecting unit 733 has selected.

When the cache memory unit 7 and the shared memory unit 8 are consolidated into one memory unit, it is necessary for the memory unit to identifier, when selecting the path to which a packet is to be transferred, whether the transfer target packet is a user user data packet or a control packet. In this case, the memory unit will include both the request packet path information unit 836 and the path selection table 835 that are mentioned in the description of the shared memory unit 8. The memory unit will also execute path selection using this information.

Figure 6:
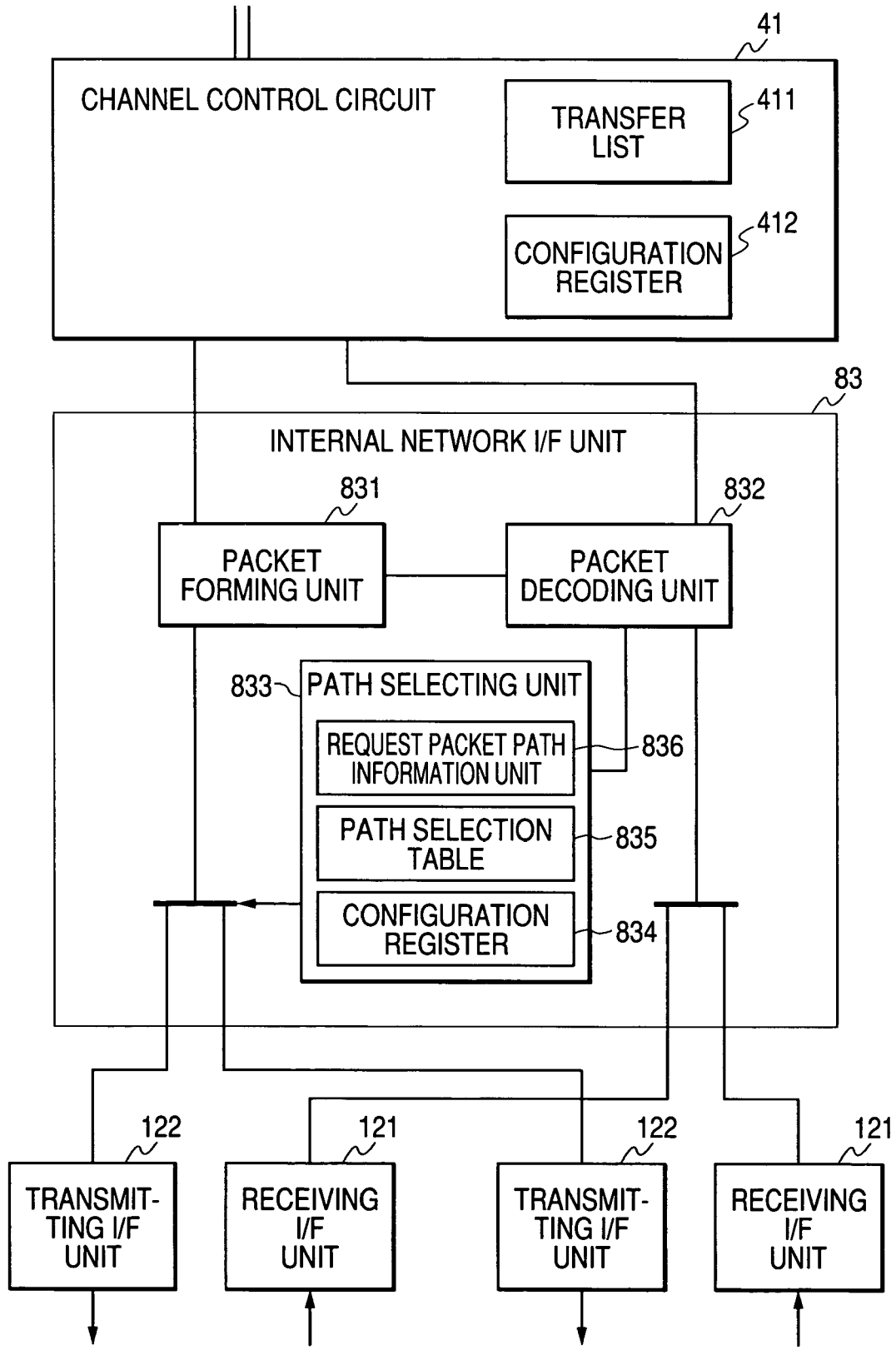
FIG. 6 is a block diagram showing an example of the configuration of a channel control unit in the embodiment.

Next, the detailed configuration of the channel control unit 4 will be described with reference to FIG. 6.

The channel control unit 4 is provided with a channel control circuit 41 that controls the channels between the clusters 10A, 10B and the host computers 2, and an internal network I/F unit 83 for communicating with the other units.

The internal network I/F unit 83 is basically the same as the internal network I/F unit of the shared memory unit 8. However, because it is necessary for the channel control unit 4 to conduct both user data access and control access, the same kind of packet determination becomes necessary as provided in the case where the cache memory unit 7 and the shared memory unit 8 are consolidated. The channel control unit 41 controls the channels on the basis of the configuration content of a configuration register 412, issues user data access to the cache memory unit 7 on the basis of a transfer list 411, transfers data on the cache memory to the host computers 2 and transfers data from the host computers 2 to the cache memory. The transfer list 411 is a list in which paths to be used by control access, transfer addresses and data lengths are set, and it is formed by the processor unit 6. Also, the disk control unit 5 has the same structure as that of the channel control unit 4 except that, in the disk control unit 5, the HDDs 3 are connected to the channel control unit 41 instead of the host computers 2.

Figure 7:
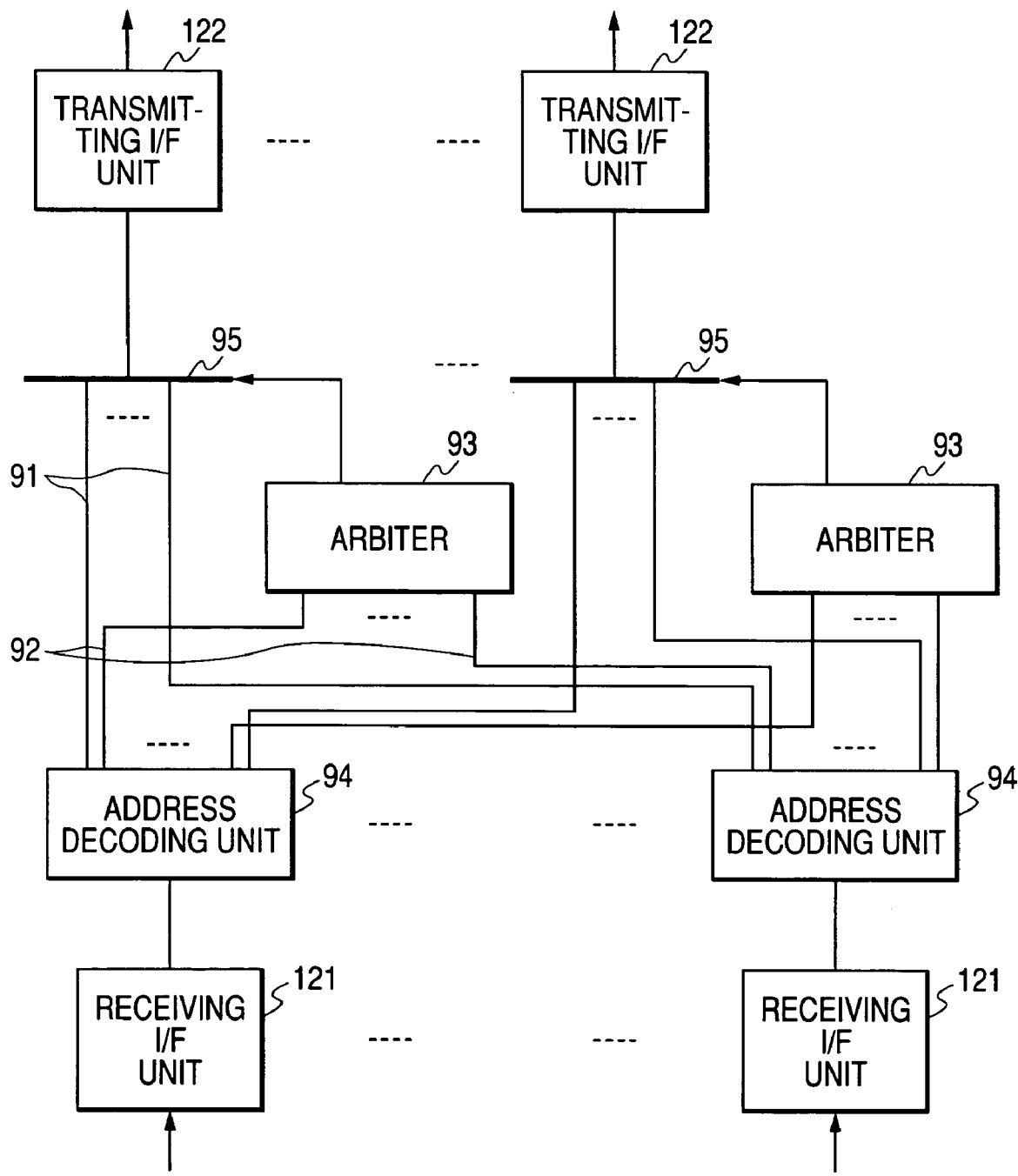
FIG. 7 is a block diagram showing an example of the configuration of an internal switch unit in the embodiment.

Next, the detailed configuration of the internal switch units 9A and 9B will be described with reference to FIG. 7. Each of the internal switch units 9A and 9B has, with respect to the paths to which it is connected, receiving I/F units 121, transmitting I/F units 122, address decoding units 94, arbiters 93 and selectors 95. The receiving I/F units 121 are connected to the address decoding units 94. Also, the transmitting I/F units 122 are connected to the selectors 95, and the selectors 95 are connected via data signal lines 91 to the address decoding units 94 that give instructions to the selectors 95. The arbiters 93 are connected to the address decoding units 94 via request signal lines 92 and grant signal lines (not shown). Below, a flow will be described where the receiving I/F units 121 receive a packet and transfer the received packet to the transmitting I/F units 122. When a receiving I/F unit 121 receives a packet, the address decoding unit 94 references the request destination address or the reply destination address of the packet that the receiving I/F unit 121 has received, and it determines the path to which the received packet is to be transferred. Moreover, the address decoding unit 94 requests transfer, via the request signal line 92, of the arbiter 93 that gives instructions to the selector 95 connected to the transmitting I/F unit 122 of the path to which the packet is to be transferred. When the arbiter 93 has received the transfer request, the arbiter 93 compares the statuses of transfer requests from the plural address decoding units 94 and determines which one of the plural address decoding units 94 is to receive access on the basis of a round robin algorithm. Then, the arbiter 93 instructs the determined one address decoding unit 94—i.e., the address decoding unit 94 having the transfer grant to the selector 95—to select the data signal line 91 connected to the selector 95, and notifies the address decoding unit 94 of the transfer grant via the grant signal line. When the address decoding unit 94 receives transfer grant, the address decoding unit 94 transfers, via the data signal line 91 and the selector 95, the packet to the transmitting I/F unit 122 connected to the path to which the packet is to be transferred.

Next, the format of the packets transmitted and received inside the storage controller 1 will be described with reference FIGS. 8A to 8D. Each read request packet, read reply packet, write request packet and write reply packet described below is present in both the user data packet and the control packet. Thus, in order to clearly distinguish these, the user data packet will be called a user data read request packet (read reply, write request, write response) and the control packet will be called a control read request (read reply, write request, write reply) packet.

FIG. 8A shows the format of a control and user data read request packet 141. The control read request packet is issued, for example, when the processor 61 of the processor unit 6 references the content of the shared memory 81 of the shared memory unit 8 (S5 in FIG. 11). The packet forming unit 641 forms the control read request packet in accordance with an instruction from the processor 61 in the processor unit 6, which that was described with reference to FIG. 3. The user data read request packet is issued, for example, when the channel control unit 4 reads the user data of the cache memory unit 7 (S19 in FIG. 11). The packet forming unit 831 generates the user data read request packet in the channel control unit 4, which that was described with reference FIG. 6. The read request packet 141 includes a packet type 131 representing the fact that the packet is a read request, a data length 132 representing the length of the data that is to be read, a sequence ID 133 for correspondence with the read reply packet that is sent later, a request source address 134 representing the packet source, and a request destination address 135 representing the destination of the packet.

FIG. 8B shows the format of a control and data read reply packet 142. The control read reply packet is issued, for example, when the shared memory unit 8 that has received the control read request packet issued from the processor unit 6 sends a content of the shared memory 81 (S6 in FIG. 11). The user data read reply packet is issued, for example, when the cache memory unit 7 has received the user data read request packet which issued from the channel control unit 4 and transmits the user data in the cache memory 71 (S20 in FIG. 11). The read reply packet 142 includes a packet type 131 representing the fact that the packet is a read reply, a data length 132 representing the length of the data that is to be sent, a sequence ID 133 of the same content as the corresponding read request packet 141, a reply source address 136 representing the packet source, a reply destination address 137 representing the destination of the packet, data 138, and a status 139 representing a status, such as the fact that the packet has been processed without a problem in the memory and that error correction has been performed by the memory. The reply source address 137 has the same content as the request source address 134 of the corresponding read request packet 141. The control read reply packet is formed, in the shared memory unit 8 that was described using FIG. 4, by the packet forming unit 138 on the basis of the data 138 that the memory controller 82 reads from the shared memory 18 and the status sent to the packet forming unit 831 together with this data 138. The user data read reply packet is formed, in the cache memory unit 8 that was described with reference to FIG. 5, by the packet forming unit 731 on the basis of the user data 138 that the memory controller 72 reads from the cache memory 71 and the status 139 sent to the packet 20 forming unit 731 together with the user data 138.

FIG. 8C shows the format of a control and user data write request packet 143. The control write request packet is issued, for example, when the processor unit 6 sets data transfer of the disk control unit 5 (S38 in FIG. 14), and the user data write request packet is issued, for example, when the channel control unit 4 writes the user data to the cache memory unit 7 (S49 in FIG. 14). The write request packet 143 includes a packet type 131 representing the fact that the packet is a write request, and it also includes, similar to the read request packet 141, a data length 132, a sequence ID 133, a request source address 134 and a request destination address 135, as well as to-be-stored data 138.

FIG. 8D shows the format of a control and user data write reply packet 144. The control write reply packet is issued, for example, in order for the disk control unit 5 that has received the control write request packet to give notification that the setting has been properly concluded (S39 in FIG. 14), and the user data write reply packet is issued, for example, in order for the cache memory unit 7 that has received the user data write request packet to give notification that memory writing has been concluded (S50 in FIG. 14). Particularly in the storage controller 1, of which high reliability is demanded, it is necessary to confirm that the packet has been properly processed, even if it involves writing access. The write reply packet 144 includes a packet type 131 representing the fact that the packet is a write reply, a data length 132, a sequence ID 133, a reply source address 136, a reply destination address 137, and a status 139.

Figure 9:
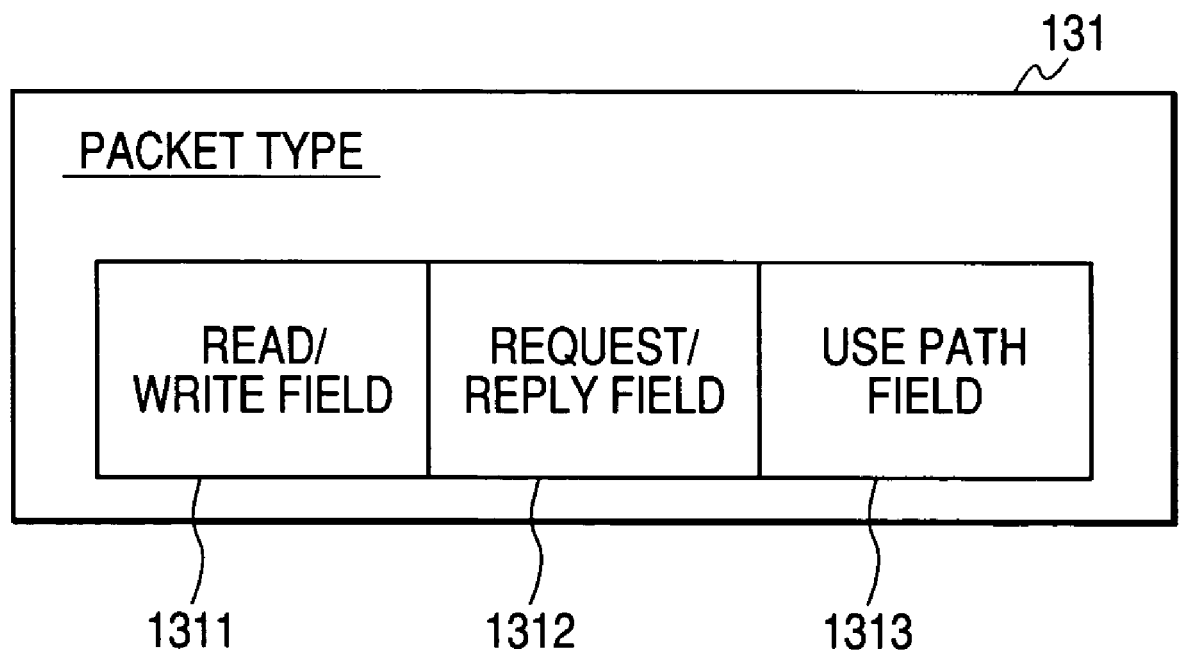
FIG. 9 is a diagram showing a detailed example of the configuration of a packet type.

Next, the detailed format of the packet type 131 in each of the packets described above will be described with reference to FIG. 9. The packet type 131 includes a read/write field 1311, a request/reply field 1312 and a use path field 1313. The read/write field 1311 and request/reply field 1312 represent whether the packet type is a read request, a read reply, a write request or a write reply. Data representing which of the two inter-cluster paths 11A and 11B to use is stored in the use path field 1313. The data in the use path field 1313 is used when the path selecting unit 833 of the shared memory unit 9 determines the use path of the packet to be transmitted in response to the use path of the received packet.

Next, the path selection table 835 disposed in the shared memory unit 8 and the channel control unit 4 will be described with reference to FIG. 10A.

The path selection table 835 has a column for a control request packet path number 835a describing the path number of the path used in the transfer of a received request packet and a column for a control reply packet path number 835b describing the path number of the path to which the corresponding reply packet is to be transmitted. The control reply packet path number 835b can be rewritten by the processor 61 in order to handle a failure. However, in a normal state, respectively different path numbers are set for the control request packet path number 835a and the control reply packet path number 835b. Thus, for example, when the shared memory unit 8 or the channel control unit 4 in the cluster 10A receives a request packet on the inter-cluster path 11A from the other cluster 10B, in a normal state, the reply packet is transmitted to the other cluster 10B using the inter-cluster path 11B. In FIG. 10A, the path numbers of the control reply packet path number 835b are shifted by 1 and cyclically set with respect to the path numbers of the control request packet path number 835a.

Next, the configuration register 644 disposed in the path selecting unit 643 of the processor unit 6 will be described with reference to FIG. 10B.

The configuration register 644 of the processor unit 6 has a request source 644a and a request packet issuance path number 644b. The request packet issuance path number 644b is rewritten when the processor 61 issues a control packet or initiates the processing of an I/O request from the host computers 2, or when the processor 61 conducts analysis of the host access statistical information 632, which is periodically conducted.

Next, the operation of the storage controller 1 when the storage controller 1 receives a read I/O request from the host computers 2 will be described with reference to FIGS. 11 to 13. Here, a case will be described where relevant data is present in the HDD 3 connected to the cluster 10B that is different from the cluster 10A that has received the read I/O request, and where the data request by the host computer 2 is not in the cache memory unit 7 of the cluster 10B.

The method of transfer of the control packet in the present embodiment is as follows. First, the processor 61 of the cluster 10, which transfers the control packet (referred to below as "the transfer source cluster 10"), determines whether it is causing the channel control unit 4 or the disk control unit 5 of the transfer source cluster 10 to transmit (write) or receive (read) a user data packet. In a case of writing a user data packet, the processor 61 of the transfer source cluster 10 transfers a control packet to the other cluster (referred to below as "the transfer destination cluster 10") using the inter-cluster path 11 that is different from the inter-cluster path 11 used for writing. In a case of reading a user data packet, the processor 61 of the transfer source cluster 10 transfers a control packet to the transfer destination cluster 10 using the same inter-cluster path 11 that is used for the reading. When the transfer destination cluster 10 receives the control packet, the transfer destination cluster 10 transfers a control reply packet, which constitutes a reply to the control packet, to the transfer source cluster 10 using the inter-cluster path that is different from the inter-cluster path 11 used for the transmission of the control packet.

As will be described later, the processor 61 of the transfer source cluster 10 may determine the tendencies of the extent to which the transfer source cluster 10 is transmitting (writing) or receiving (reading) user data packets including the data 138 and determine the path to be used for the transfer of the control packet.

Figure 11:
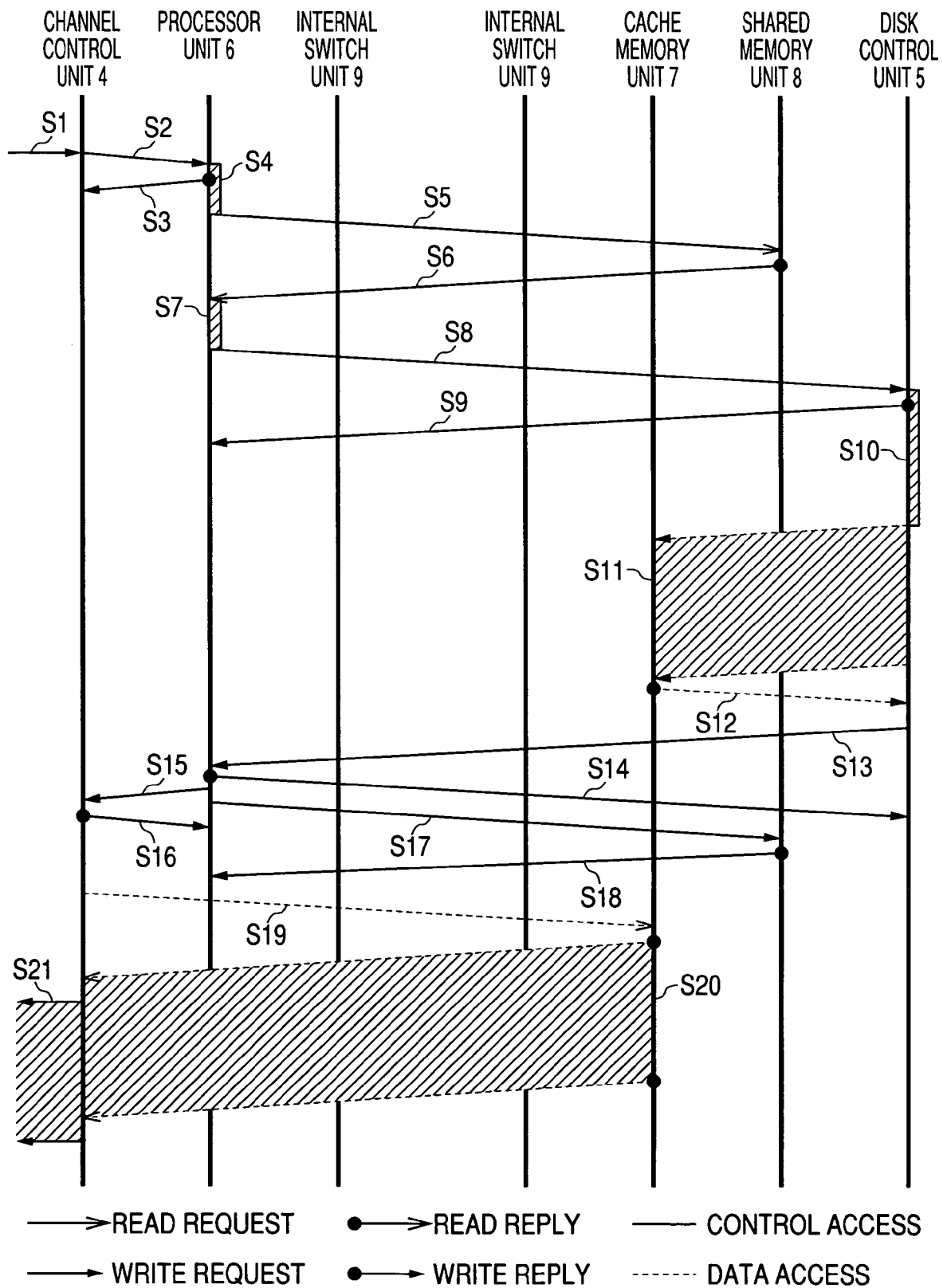
FIG. 11 is a sequence diagram showing an example of the operation of the storage controller when a read request of a host computer is received.

As shown in FIG. 11, when the channel control unit 4 of the cluster 10A receives a read I/O request from the host computer 2 (S1), the channel control unit 4 transmits a control write request packet to the processor unit 6 in order to notify the processor unit 6 of the reception of the read I/O request (S2) and waits for a control write reply packet corresponding to the control write request packet (S3). In step 3 and in later-described steps 9, 14, 16 and 18 and steps 33, 39, 44, 46 and 52 of FIGS. 14 and 15, there are also cases where the control channel unit 4 conducts the next processing without waiting on the reception of the control reply packet. The packet decoding unit 642 of the processor unit 6 sends the data 138 of the control write packet to the processor 61. The processor 61 decodes this data and acquires the fact that the I/O request that the channel control unit 4 has received is a read I/O request, as well as the address and data size of the target data. The processor 61 can also determine, from the address of the target data, in which cluster the target data are present. Here, the processor 61 determines that the target data are present in the cluster 10B, which is the other cluster (S4).

Figure 17:
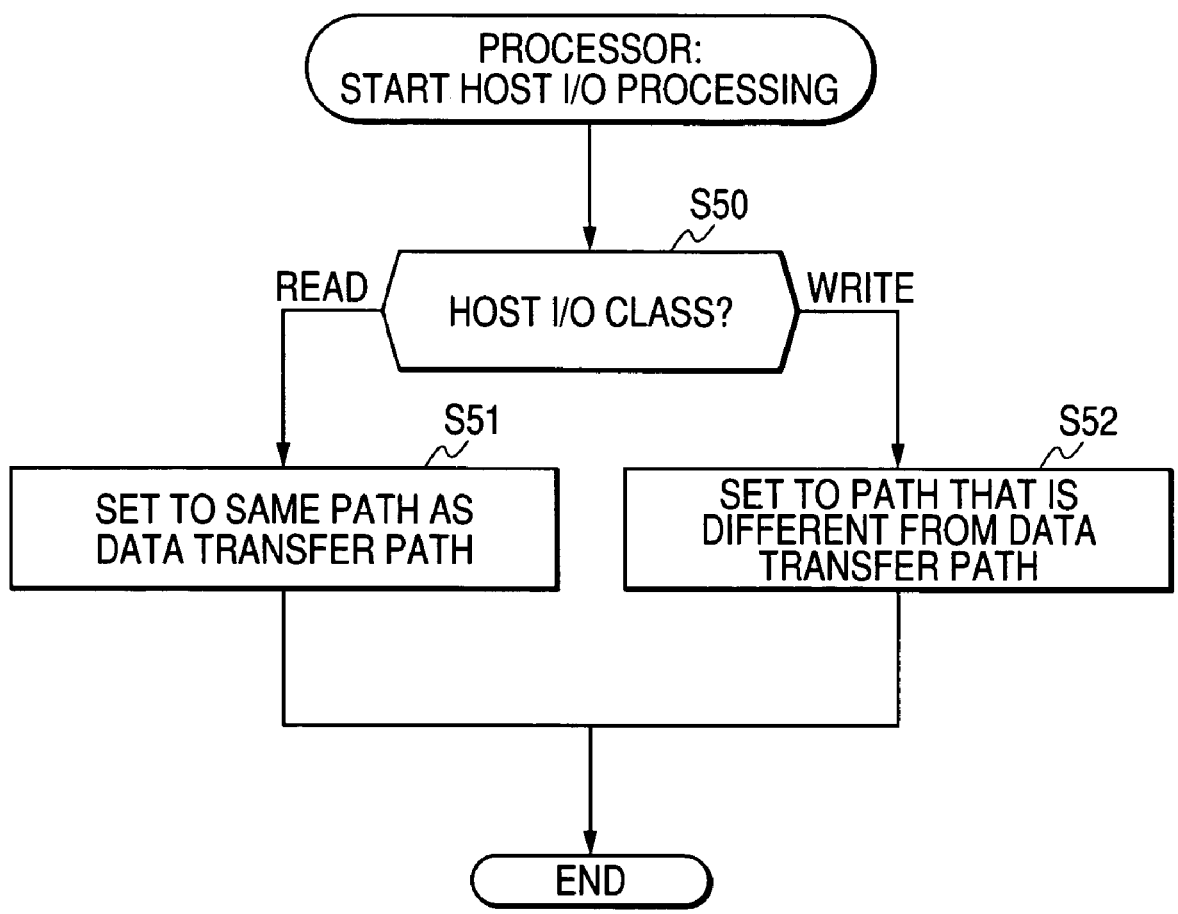
FIG. 17 is a flow chart showing an example of the setting procedure of the configuration register.

Then, the processor 61 executes the processing shown in FIG. 17. In this processing, the processor 61 determines whether the I/O request from the host computer 2 is a read request or a write request (S50; here already executed in S4). If the I/O request is a read request, the processor 61 sets the configuration register 644 of the path selecting unit 643 so that the control packet is transferred by a same path as the path used for the transfer of the user data packet (S51). If the I/O request is a write request, the processor 61 sets the configuration register 644 of the path selecting unit 643 so that the control packet is transferred by the path that is different from the path used for the transfer of the user data packet (S52). In this case, because the I/O request is a read request, the processor 61 sets to the configuration register 644 of the path selecting unit 643 an indication to transfer the control packet by the same path as the path used for the transfer of the user data packet. The path used for the transfer of the user data packet is fixedly predetermined per processor unit 6, channel control unit 4 and disk control unit 5 at an initial setting time or the like so that the load is dispersed in a balanced manner. In this specification, it is assumed that the path used for the transfer of the user data packet is determined to be the inter-cluster path 11A out of the two inter-cluster paths 11A and 11B. Thus, when the storage controller 1 has received the read I/O request, the control packet is transferred using the inter-cluster path 11A. For example, it will be assumed that the number of the cluster 10A receiving the I/O request from the host computer 2 is "1", that the path used for the transfer of the user data packet is set to the inter-cluster path 11A (path number "0"), and that the configuration register 644 is set to the content shown in FIG. 10B. In this case, the control packet is transferred using the inter-cluster path 11A of the path number "0" with respect to the cluster 10B of the cluster number "0".

Moreover, the processor unit 6 transmits the control read request packet to the shared memory unit 8 of the cluster 10B in order to acquire the configuration information of the cluster 10B and the directory information of the cache memory unit 7 of the cluster 10B (S5). At this time, the packet forming unit 641 of the processor unit 6 generates the control read request packet 141 due in response to an instruction from the processor 61. Also, the path selecting unit 643 references the configuration register 644 and determines the inter-cluster paths 11A and 11B to be used for the transfer of the read request packet 141. In a case where the configuration register 644 is set to the content shown in FIG. 10B, as was previously described, when the cluster number of the transfer source cluster is "0", the path selecting unit 643 instructs the selector to use path number "0", i.e., the inter-cluster path 11A. As a result, the control read request packet is transferred via the transmitting I/F unit 122 connected to the inter-cluster path 11A, from the internal switch unit 9A, through the inter-cluster path 11A and the internal switch unit 9A of the other cluster 10B, to the shared memory unit 8 of the other cluster 10B.

The shared memory unit 8 of the other cluster 10B receives the control read request packet and transfers, to the processor unit 6 of the request source cluster 10A, the control read request packet, including the configuration information and the directory information (S6). At this time, the packet decoding unit 832 of the shared memory unit 8 of the other cluster 10B receives the control read request packet, decodes the read request packet as described previously, acquires the number of the path used in the reception of the read request packet from the use path field 1313 (FIG. 9) included in the packet, writes the path number in the request packet path information unit 836 of the path selecting unit 833, and sends the request described in the request packet to the memory controller 82. The number of the path used may also be acquired, on the basis of from which receiving I/F unit 121 it has been received, without using the information of the use path field 1313. The same is true in regard to other sites. The memory controller 82 processes the request, sends the configuration information and the directory information from the shared memory 81 to the packet forming unit 831, and requests creation of the control reply packet. The packet forming unit 831 forms the control reply packet, including data from the memory controller 82, in accordance with the request from the memory controller 82. At the same time, the path selecting unit 833 references the path selection table 835 and selects the path corresponding to the path number described in the request packet path information unit 836. In a case where the path selection table 835 is set to the content shown in FIG. 10A, i.e., in a case where the path selection table 835 is set so that the reply packet path number is "1" (inter-cluster path 11B) with respect to the path number of the control request packet that is "0" (inter-cluster path 11A), the path selecting unit 833 sets the selector to use the inter-cluster path 11B. As a result, the control read reply packet is transferred via the transmitting I/F unit 122 connected to the inter-cluster path 11B, from the internal switch unit 9B, through the inter-cluster path 11B and the internal switch unit 9A of the request source cluster 10B, to the processor unit 6 of the request source cluster 10B.

When the processor unit 6 of the request source cluster 10A receives the control read reply packet from the shared memory unit 8 of the other cluster 10B (S6), the processor unit 6 references the configuration information and the directory information included in the read reply packet, and determines whether the data to be returned to the host computer 2 is present in the cache memory unit 7 of the other cluster 10B. Here, as described previously, because the relevant data is not present in the cache memory unit 7, the disk control unit 5 of the other cluster 10B forms a transfer list in order to transfer the relevant data from the HDD 3 to the cache memory unit 7. Also, here, the channel control unit 4 of the request source cluster 10A also forms a transfer list for transferring the relevant data from the cache memory unit 7 of the other cluster 10B to the host computer 2 (S7). Then, the processor unit 6 sends the control write request packet, including the data of the aforementioned transfer list, to the disk control unit 5 controlling the HDD 3 in which the data serving as the target of the I/O request is present (S8),
and receives the reply thereto (S9). Similar to S5, the inter-cluster path 11A is used for the transfer of the control write request packet from the processor unit 6 to the other cluster 10B, and the inter-cluster path 11B, which is different from the inter-cluster path 11A used at the time of the transfer of the control write request packet, is used for the transfer of the control write reply packet with respect to the control write request packet.

When the disk control unit 5 of the other cluster 10B receives the transfer list, the disk control unit 5 controls the HDD 3 on the basis of the transfer list and reads the data (S10). Moreover, the disk control unit 5 writes the data from the HDD 3 to the address region of the cache memory unit 7 based on the transfer list, i.e., transmits the user data write request packet (S11) and receives the user data write reply packet from the cache memory unit 7 (S12). When the disk control unit 5 receives this reply, the disk control unit 5 transmits the control write request packet in order to notify the processor unit 6 of the request source cluster 10A of the fact that the data have been stored in the cache memory unit 7 (S13), and receives the reply thereto (S14). When the processor unit 6 of the request source cluster 10A receives the notification, the processor unit 6 sends the transfer list formed in S7 to the channel control unit 4 (S15, S16) and updates the directory information of the shared memory unit 8 of the other cluster 10B because the data have been stored in the cache memory unit 7 of the other cluster 10B (S17, S18). The request source channel control unit 4 transmits the user data read request packet relating to the relevant data to the cache memory unit 7 of the other cluster 10B (S19). At this time, because the user read request is for user data access, the path selecting unit 833 of the request source channel control unit 4 references the configuration register 834 and selects the predetermined inter-cluster path 11A. For this reason, the user data read request packet of S19 is sent via the inter-cluster path 11A to the cache memory unit 7 of the other cluster 10B. The cache memory unit 7 of the other cluster 10B transfers the relevant data to the request source channel control unit 4 with respect to the read request, i.e., transmits the user data read reply packet (S20). At this time, in the cache memory unit 7 of the other cluster 10B, the packet decoding unit 732 decodes the user data read request packet, acquires the path used in the reception of the user data read request packet from the use path field 1313 (FIG. 9) included in the packet, writes this path number in the request packet path information unit 736 of the path selecting unit 733, and sends the request described in the request packet to the memory controller 72. The memory controller 72 processes this request, sends the relevant data from the cache memory 71 to the packet forming unit 731, and requests creation of the read reply packet. The packet forming unit 731 forms the data read reply packet including the data from the memory controller 72 in accordance with the request from the memory controller 72. At the same time, the path selecting unit 733 selects the path of the same number as the path number described in the request packet path information unit 736. In other words, the selector is set to use the inter-cluster path 11A because the path number of the data read reply packet is "0" because the path number of the user data read request packet is "0" (inter-cluster path 11A). As a result, the user data read reply packet including the relevant data is transferred via the transmitting I/F unit 122 connected to the inter-cluster path 11A, from the internal switch unit 9A, through the inter-cluster path 11A and the internal switch unit 9A of the request source cluster 10A, to the channel control unit 4 of the request source cluster 10A.

When the channel control unit 4 receives the user data read reply packet including the relevant data from the other cluster 10B, the channel control unit 4 transfers the relevant data to the host computer 2 and ends the read request processing from the host computer 2.

Figure 13:
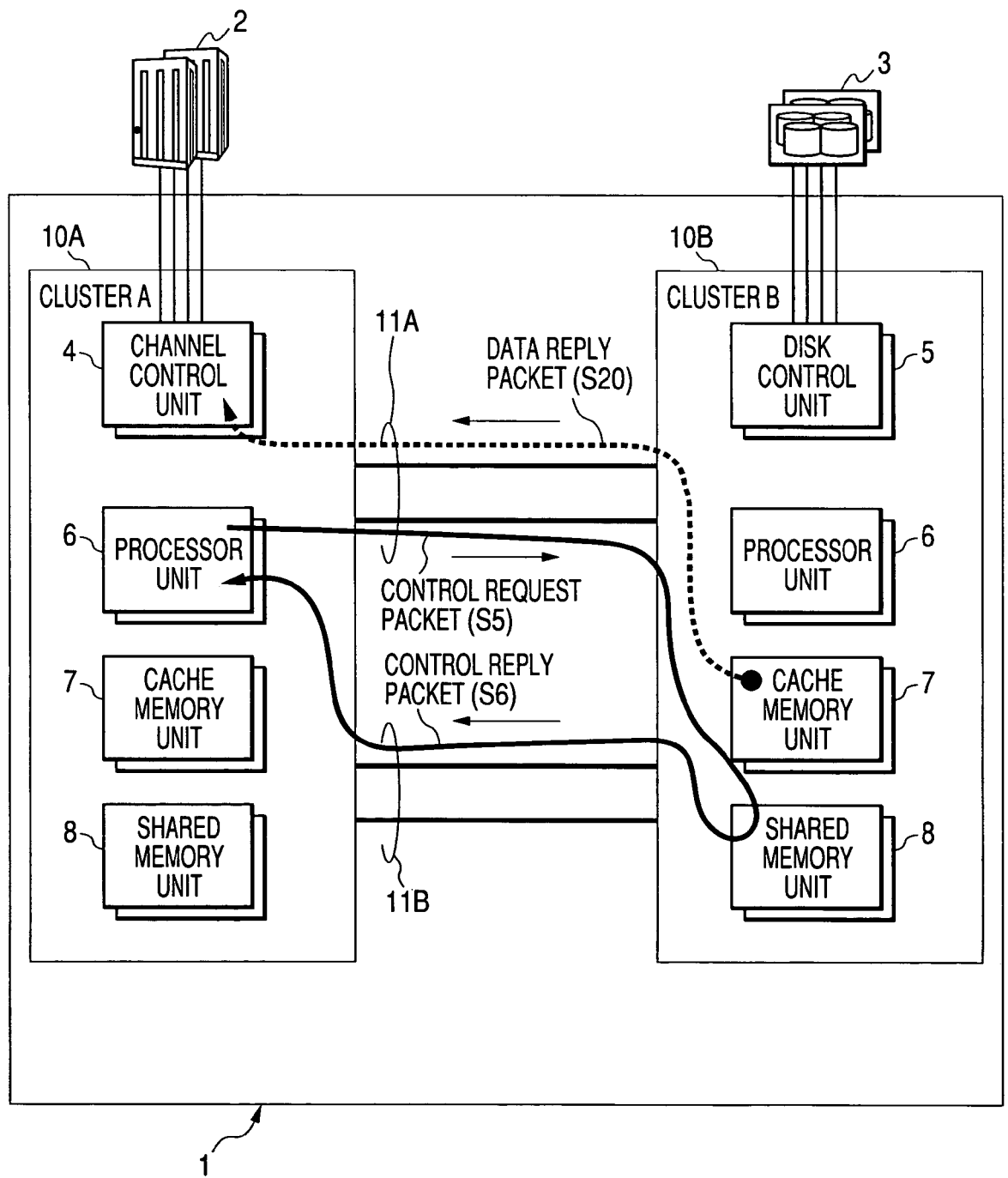
FIG. 13 is a diagram showing inter-cluster paths used by various types of packets when a read request of the host computer is received.

In the present embodiment, as shown in FIG. 13, in a case where the inter-cluster path 11A is used as the path of the data read reply packet from the cluster 10B to the cluster 10A, the inter-cluster path 11A to which the user data read reply packet is transferred is used when the control read request packet is sent from the cluster 10A to the shared memory unit 8 of the cluster 10B, and the inter-cluster path 11B that is different from the inter-cluster path 11A to which the user data read reply packet is transferred is used when the control read reply packet is sent from the cluster 10B to the cluster 10A. Thus, the control packet does not compete with the user data read reply packet or the user data write request packet, which contain data 138, in the inter-cluster paths 11A and 11B. Thus, the user data packet and the control packet do not compete in the inter-cluster paths 11A and 11B. For this reason, even if the read I/O request is received from the host computer 2 and the control read request packet is sent from the cluster 10A to the shared memory unit 8 of the cluster 10B (S5), or the control read reply packet is sent from the cluster 10B to the cluster 10A (S6), while the user data read request packet is being transferred from the cluster 10B to the cluster 10A using the inter-cluster path 11A, the transfer of these control packets does not end up being delayed by the transfer of the user data read reply packet resulting from the previous read I/O request (S20).

Figure 12:
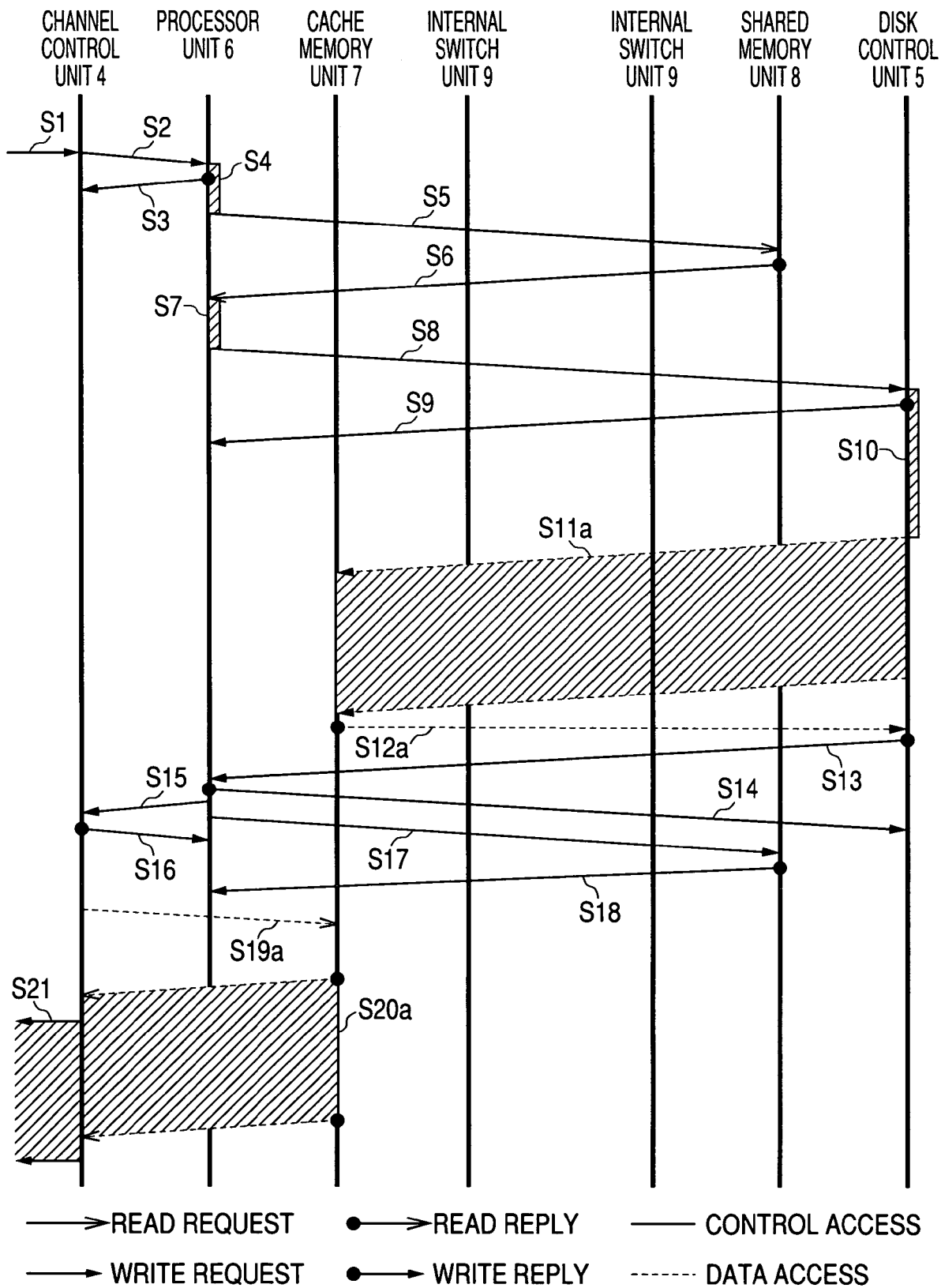
FIG. 12 is a sequence diagram showing another example of the operation of the storage controller when a read request of the host computer is received.

In the above description, the user data that the disk control unit 5 of the other cluster 10B read was temporarily stored in the cache memory unit 7 of the other cluster 10B (S11, S12) and the user data stored in the cache memory unit 7 was transferred to the channel control unit 4 of the request source cluster 10A (S19, S20); however, as shown in FIG. 12, the user data that the disk control unit 5 of the other cluster 10B read may be stored in the cache memory unit 7 of the request source cluster 10A (S11a, S12a) and the user data stored in the cache memory unit 7 may be transferred to the cache control unit 4 of the request source cluster 10A (S19a, S20a). In this case, the inter-cluster path used when the user data that the disk control unit 5 of the other cluster 10B read are stored in the cache memory unit 7 of the request source cluster 10A (S11a) is, similar to the previous example, the inter-cluster path 11A, and effects that are the same as those of the previous example can be obtained.

Also, in the above example, when the relevant data is present in the cache memory unit 7 of the other cluster 10B, the access of S8 to S14 and S17 and S18 does not happen.

Next, the operation of the storage controller 1 when the storage controller 1 receives a write I/O request from the host computer 2 will be described with reference to FIGS. 14 to 16. Here, a case will be described where the relevant data is stored in the HDD 3 connected to the cluster 10B that is different from the cluster 10A receiving the write I/O request, and where there is no space to store the data of the write request in the cache memory unit 7 of the cluster 10B.

Figure 14:
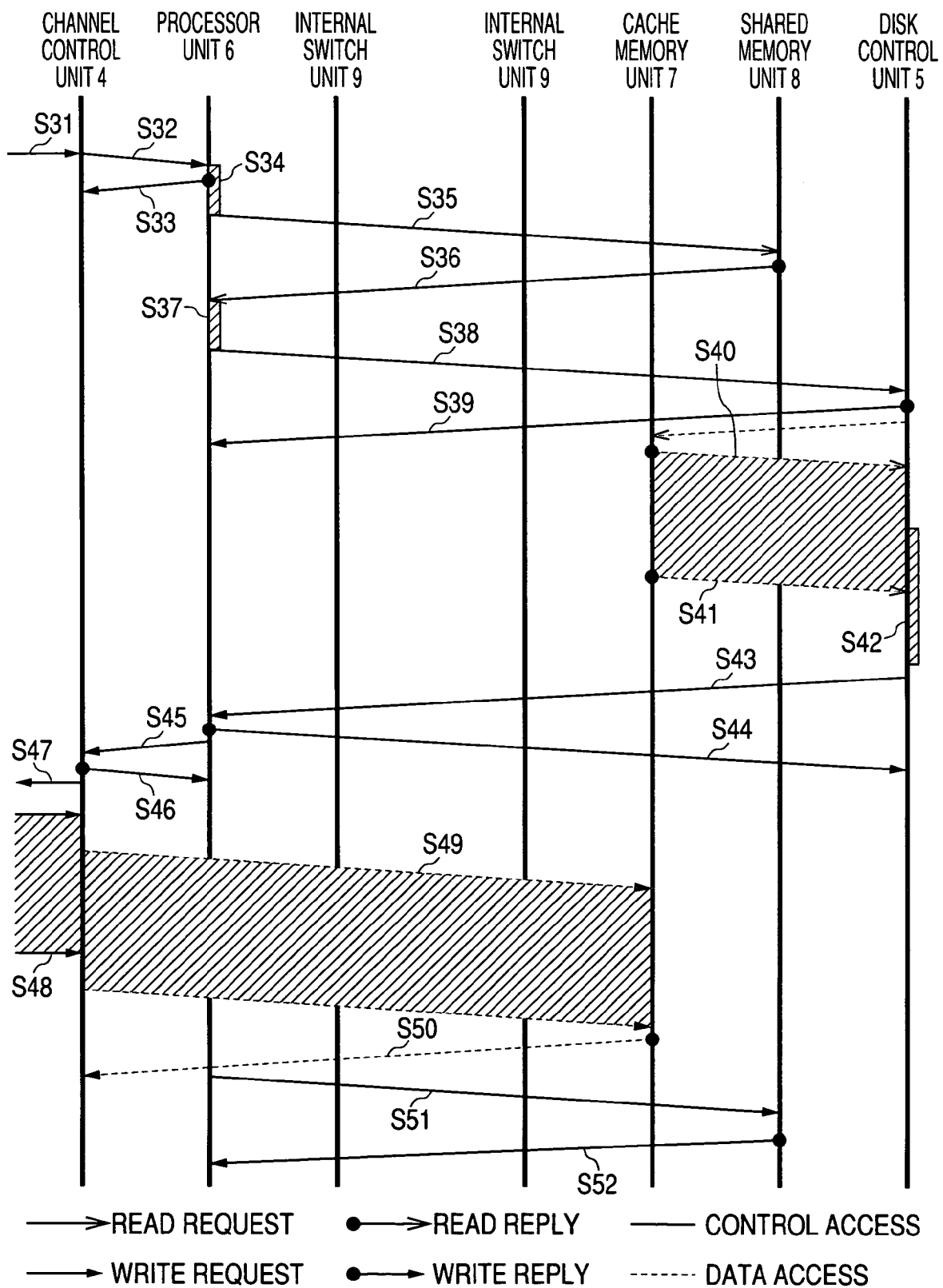
FIG. 14 is a sequence diagram showing an example of the operation of the storage controller when a write request of a host computer is received.

As shown in FIG. 14, when the channel control unit 4 of the cluster 10A receives the write I/O request from the host computer 2 (S31), the channel control unit 4 transmits a control write request packet to the processor unit 6 in order to notify the processor unit 6 of the reception of the write I/O request (S32) and waits for a control write reply packet that constitutes the response thereto (S33). The packet decoding unit 642 of the processor unit 6 sends the data 138 of the control write packet to the processor 61. The processor 61 decodes this data, and it acquires the fact that the I/O request that the channel control unit 4 has received is a write request, as well as the address and data size of the target data. The processor 61 can also determine, from the address of the target data, in which cluster to store the target data. Here, the processor 61 determines that the target data are to be stored in the cluster 10B that is the other cluster (S34).

Then, similar to the case of the read request, the processor 61 executes the processing shown in FIG. 17. In this processing, the processor 61 determines whether the I/O request from the host computer 2 is a read request or a write request (S50; here already executed in S34). Here, because the I/O request is a write request, the processor 61 sets the configuration register 644 of the path selecting unit 643 so that the control packet is transferred by a path that is different from the transfer path of the user data packet (S51). In this case, because the path used for the transfer of the user data packet is preset to the inter-cluster path 11A out of the two inter-cluster paths 11A and 11B, the path used for the transfer of the control packet when a write I/O request is received becomes the inter-cluster path 11B.

Moreover, the processor unit 6 transmits the control read request packet to the shared memory unit 8 of the cluster 10B in order to acquire the configuration information of the other cluster 10B and the directory information of the cache memory unit 7 of the cluster 10B (S35). At this time, the packet forming unit 641 of the processor unit 6 forms the control write request packet 143 due to an instruction from the processor 61. Also, the path selecting unit 643 references the configuration register 644 and determines the inter-cluster paths 11A and 11B to be used for the transfer of the write request packet 143. In this case, as was previously described, because the inter-cluster path 11B is set for the transfer path of the control packet in the configuration register 644, the path selecting unit 643 instructs the selector to use the inter-cluster path 11B. As a result, the control read request packet is transferred via the transmitting I/F unit 122 connected to the inter-cluster path 11B, from the internal switch unit 9B, through the inter-cluster path 11B and the internal switch unit 9A of the other cluster 10B, to the shared memory unit 8 of the other cluster 10B.

The shared memory unit 8 of the other cluster 10B receives the control read request packet (S35) and transfers, to the processor unit 6 of the request source cluster 10A, the control read request packet including the configuration information and the directory information (S36). At this time, the packet decoding unit 832 of the shared memory unit 8 of the other cluster 10B receives this read request packet, decodes the read request packet as described previously, acquires the number of the path used in the reception of the read request packet from the use path field 1313 (FIG. 9) included in the packet, writes the path number in the request packet path information unit 836 of the path selecting unit 833, and sends the request described in the request packet to the memory controller 82. The memory controller 82 processes the request, sends the configuration information and the directory information from the shared memory 81 to the packet forming unit 831, and requests creation of the read reply packet. The packet forming unit 831 forms the control read reply packet including the data from the memory controller 82 in accordance with the request from the memory controller 82. At the same time, the path selecting unit 833 references the path selection table 835 and selects the path corresponding to the path number described in the request packet path information unit 836. In this case, because the path number of the path used by the reply packet to be transmitted is set in the path selection table 835 to a different number with respect to the path number of the path used in the reception of the request packet, the path selecting unit 835 sets the selector to use the inter-cluster path 11A. As a result, the control read reply packet is transferred via the transmitting I/F unit 122 connected to the inter-cluster path 11A, from the internal switch unit 9A, through the inter-cluster path 11A and the internal switch unit 9A of the request source cluster 10A, to the processor unit 6 of the request source cluster 10A.

When the processor unit 6 of the request source cluster 10A receives the control read reply packet from the shared memory unit 8 of the other cluster 10B (S36), the processor unit 6 references the configuration information and the directory information included in the read reply packet, and determines whether the region in which the data requested by the host computer 2 is to be stored is present in the cache memory unit 7 of the other cluster 10B. Here, as described previously, because the region in which the relevant data to be stored is not present in the cache memory unit 7, part of the data stored in the cache memory unit 7 is stored in the HDD 3 and an empty region is formed in the cache memory 71 of the cache memory unit 7. For this reason, the processor 61 of the request source processor unit 6 forms the transfer list in order to cause the disk control unit 5 of the other cluster 10B to transfer the data from the cache memory unit 7 to the HDD 3. Also, here, a transfer list is formed for causing the relevant data to be transferred from the request source channel control unit 4 to the cache memory unit 7 of the other cluster 10B (S37). The request source processor unit 6 sends the aforementioned transfer list to the disk control unit 5 of the HDD 3, which stores the data present in the region serving as the empty region (S38, S39). When the disk control unit 5 receives the transfer list, the disk control unit 5 reads the relevant data from the cache memory unit 7 on the basis of the transfer list, i.e., the disk control unit 5 transmits the user data write request packet to the cache memory unit 7 (S40), receives the user data read reply packet from the cache memory unit 7 (S41), and stores the data included in the packet in the HDD 3 (S42). When the storage of the data ends, the disk control unit 5 notifies the request source processor unit 6 of the fact that the data have been stored in the HDD 3 (S43, S44). When the processor unit 6 receives the notification, the processor unit 6 sends the transfer list formed in S37 to the channel control unit 4 (S45, S46). The channel control unit 4 notifies the host computer 2 of the fact that preparation for receiving the data has been completed (S47), and, in response thereto, the host computer 2 transfers the write data (S48). When the channel control unit 4 receives the write data, the channel control unit 4 writes the write data received from the host computer 2 in the cache memory unit 7 of the other cluster 10B, i.e., the channel control unit 4 transmits the user data write request packet to the cache memory unit 7 (S49) and receives the user data write reply packet from the cache memory unit 7 (S50). At this time, the path selecting unit 833 of the channel control unit 4 determines the inter-cluster path to which the user data write request packet is to be sent on the basis of the predetermined path number set in the configuration register 843. In this case, because the inter-cluster path 11A is set in advance in the configuration register 843 as the use path when sending the user data packet, the path selecting unit 833 instructs the selector to use the inter-cluster path 11A. As a result, the user data write request packet is transferred via the transmitting I/F unit 122 connected to the inter-cluster path 11A, from the internal switch unit 9A, through the inter-cluster path 11A and the internal switch unit 9A of the other cluster 10B, to the cache memory unit 7 of the other cluster 10B. Also, because the data is stored in the cache memory unit 7 of the other cluster 10B, the request source processor unit 6 updates the directory information of the shared memory unit 8 of the other cluster 10B (S51, S52) and ends the write request processing from the host computer 2. Thereafter, in the other cluster 10B, the write data stored in the cache memory unit 7 is stored in the HDD 3.

Figure 16:
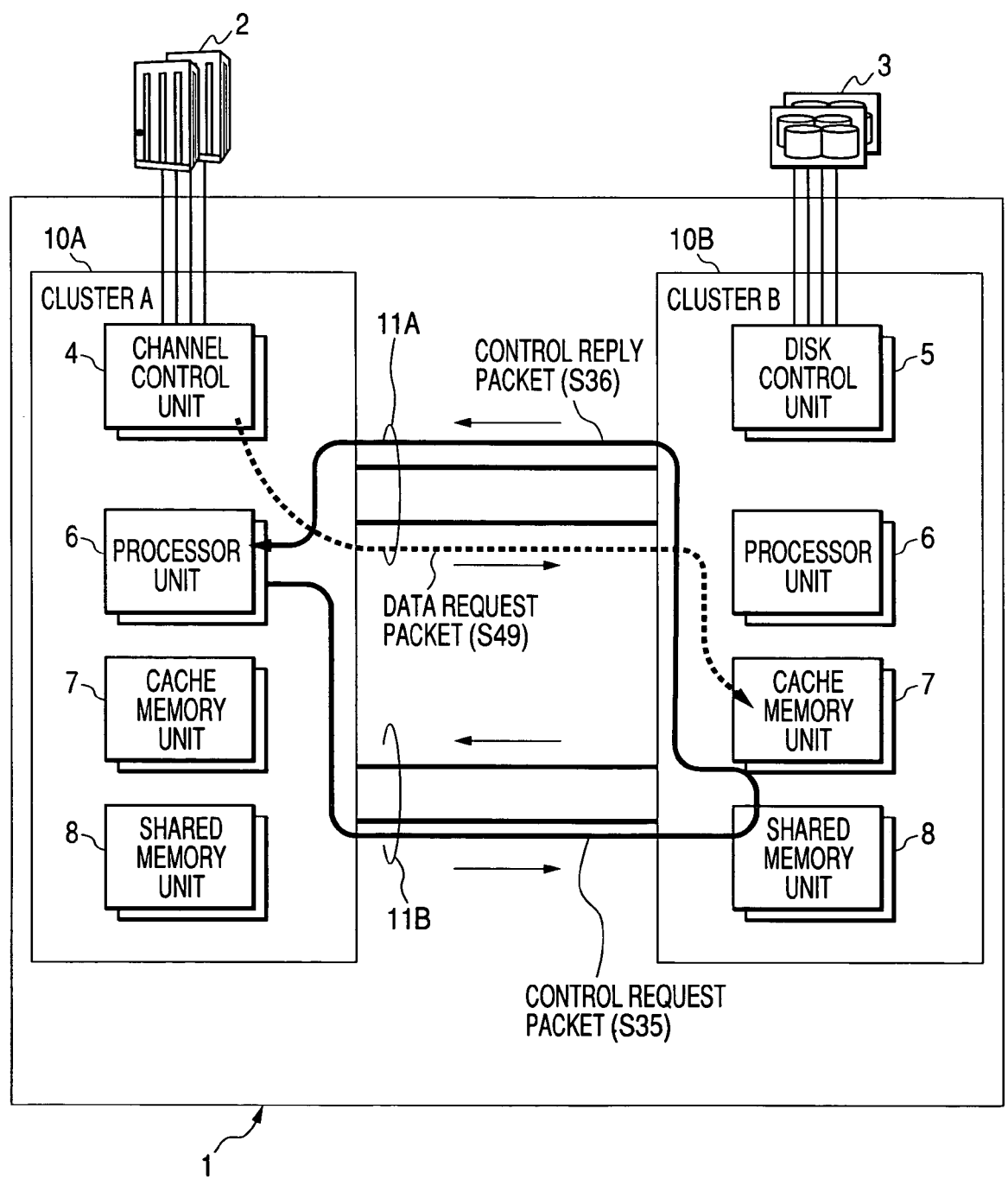
FIG. 16 is a diagram showing inter-cluster paths used by various types of packets when a write request of a host computer is received.

In the present embodiment, as shown in FIG. 16, in a case where the inter-cluster path 11A is used as the path of the user data write request packet from the cluster 10A to the cluster 10B (S49), the inter-cluster path 11B that is different from the inter-cluster path 11A to which the user data write request packet is transferred is used when the control read request packet is sent from the cluster 10A to the shared memory unit 8 of the cluster 10B (S35), and the inter-cluster path 11A to which the data write request packet is transferred is used when the control read reply packet is sent from the cluster 10B to the cluster 10A (S36). Thus, the control packet does not compete with the user data read reply packet or the user data write request packet which contain data 138, in the inter-cluster paths 11A and 11B. Thus, the user data packet and the control packet do not compete in the inter-cluster paths 11A and 11B. For this reason, even if the write I/O request is received from the host computer 2 and the control read request packet is sent from the cluster 10A to the shared memory unit 8 of the cluster 10B (S35), or the control read reply packet is sent from the cluster 10B to the cluster 10A (S36), while the user data write request packet is being transferred from the cluster 10A to the cluster 10B using the inter-cluster path 11B, the transfer of these control packets does not end up being delayed by the transfer of the user data read reply packet resulting from the previous read I/O request (S20).

Figure 15:
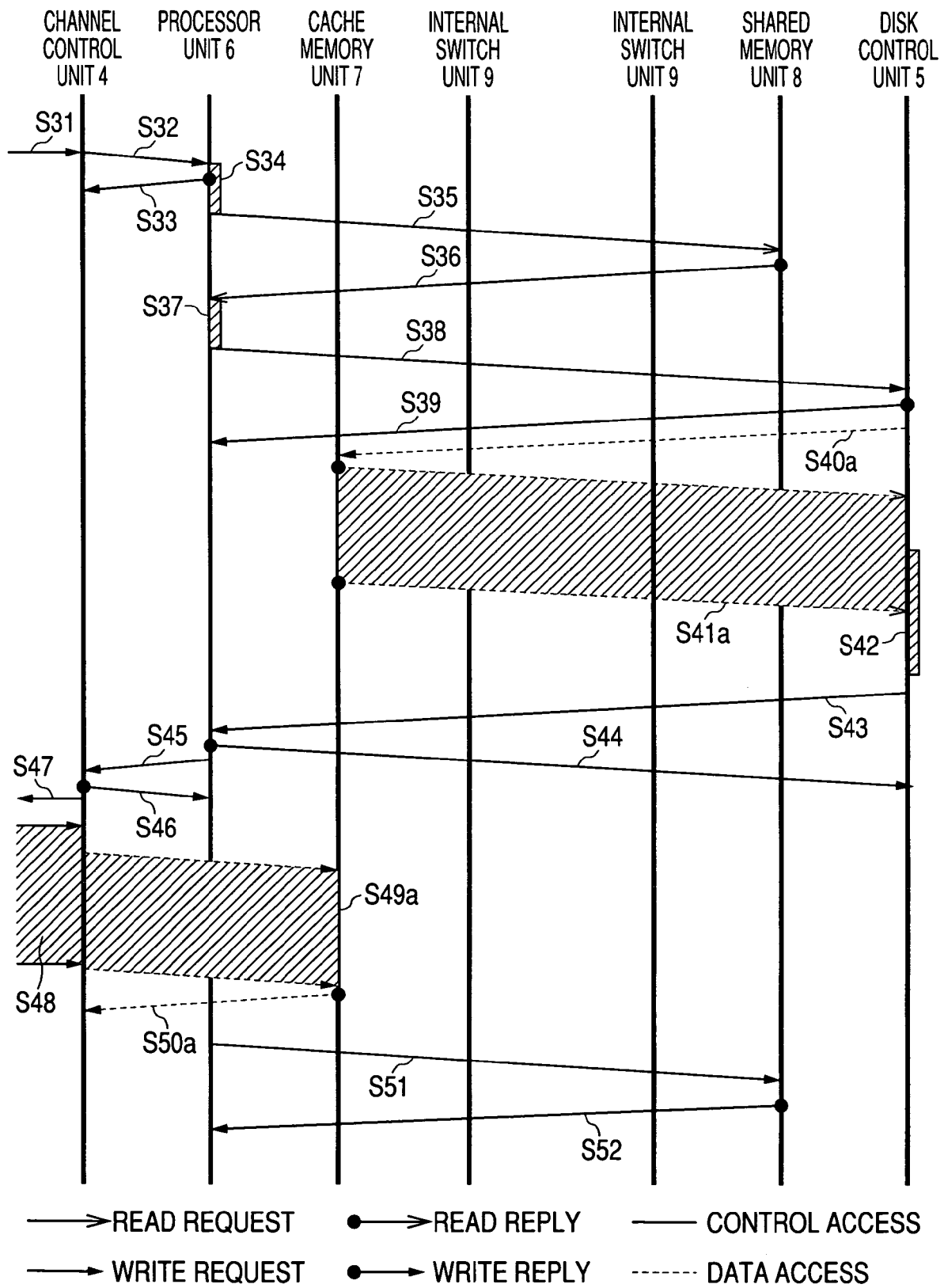
FIG. 15 is a sequence diagram showing another example of the operation of the storage controller when a write request of a host computer is received.

In the above description, after the user data was temporarily stored in the HDD 3 from the cache memory unit 7 of the other cluster 10B (S40, S41), the write data was transferred from the request source channel control unit 4 to the cache memory unit 7 of the other cluster 10B (S49, S50), but as shown in FIG. 15, after the user data is stored in the HDD 3 of the other cluster 10B from the request source cache memory unit 7 (S40a, S41a), the write data may be similarly stored in the request source cache memory unit 7 from the request source channel control unit 4 (S49a, S50a). In this case, the inter-cluster path used when the user data is stored in the HDD 3 of the other cluster 10B from the request source cache memory unit 7 (S41a) is, similar to the previous example, the inter-cluster path 11A, and effects that are the same as those of the previous example can be obtained.

Also, in the above example, when an empty region is present in the cache memory unit 7 of the other cluster 10B, the access of S38 to S44 does not happen.

In the above description, it was determined, each time an I/O request was received from the host computers 2, whether the I/O request was a read request or a write request, and the inter-cluster path used for the transfer of the control packet was determined in response to the content of the I/O request. However, it is not invariably necessary to predetermine the inter-cluster path used for the transfer of the control packet in response to the content of the I/O request each time an I/O request is received.

For example, in a case where the tendency of I/O requests from the host computers 2 is biased towards read requests or write requests, the inter-cluster path used for the transfer of the control packet may be determined in response to this tendency.

Figure 18:
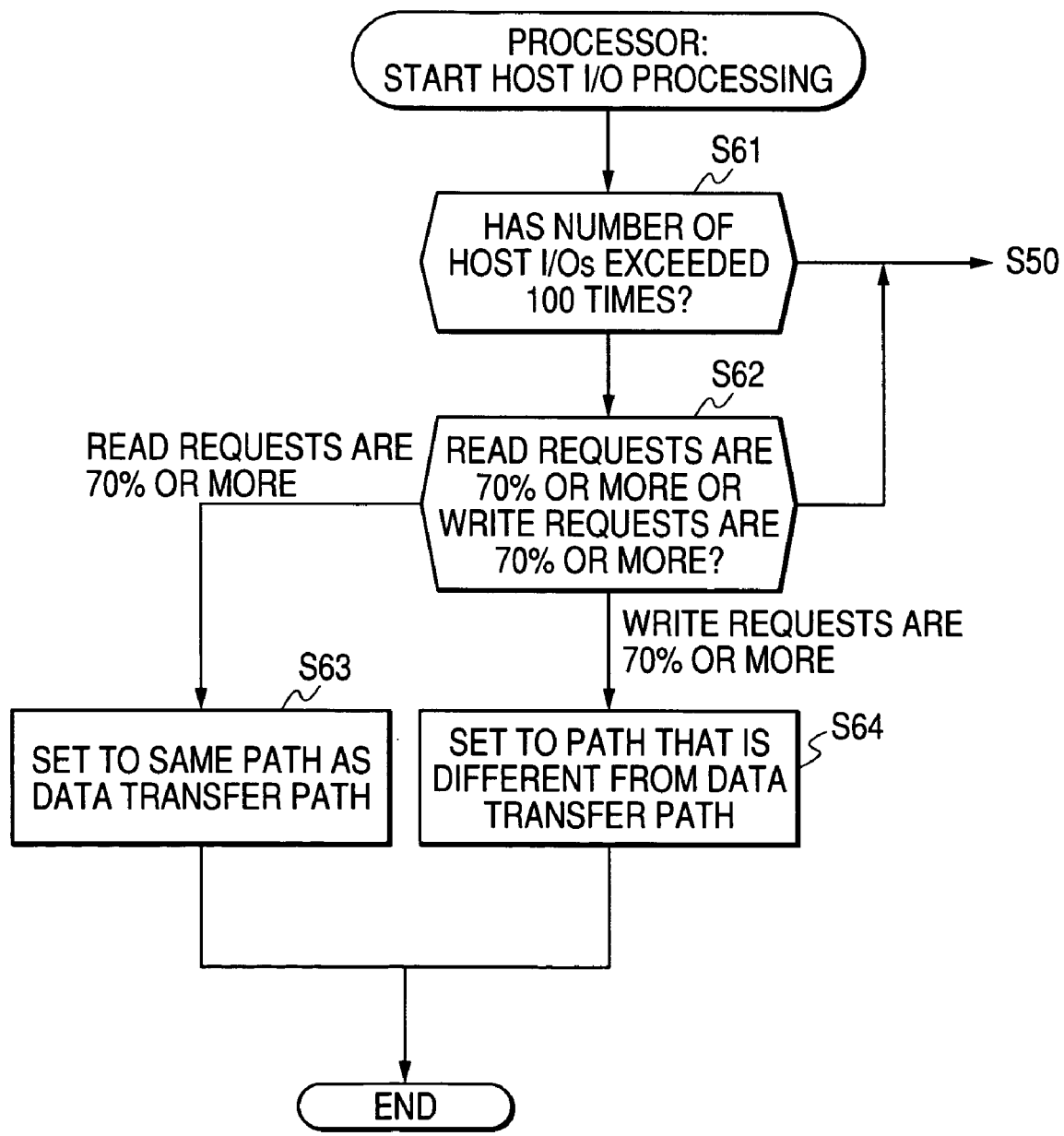
FIG. 18 is a flow chart showing another example of the setting procedure of the configuration register.

Specifically, when the processor 61 of the processor unit 6 receives an I/O request from a host computer 2 via the channel control unit 4, the fact that there was one read request or write request may be stored in the host access statistical information 632 of the main memory 63 and the processing shown in FIG. 18 may be executed. In this processing, the processor 61 references the host access statistical information 632 of the main memory 63 and determines whether or not the number of I/O requests from the host computer 2 (host I/Os) exceeds a predetermined number, such as 100,000 times (S61). If the number of host I/Os does not exceed the predetermined number, the processor 61 moves to the aforementioned processing of S50 shown in FIG. 17. If the number of host I/Os exceeds the predetermined number, the processor 61 again references the host access statistical information 632 and determines whether read requests exceed 70% of the total I/O requests received up to now or whether write requests exceed 70% of the total I/O requests received up to now; in other words, the processor 61 determines whether the tendency of the I/O requests received up to now is biased towards read requests or biased towards write requests (S62). If neither read requests nor write requests exceed 70% of the total I/O requests, the processor 61 moves to the processing S50 of FIG. 17. If read requests exceed 70% of the total I/O requests, the processor 61 sets the configuration register 644 of the path selecting unit 643 to transfer the control packet by the same path as the transfer path of the user data packet (S63). If write requests exceed 70% of the total I/O requests, the processor 61 sets the configuration register 644 of the path selecting unit 643 to transfer the control packet by a path different from the transfer path of the user data packet (S64).

Namely, in the above-described processing, when the I/O requests are biased towards read requests, the same processing as when a read request is received in FIG. 17 is conducted with relation to whether the I/O request received from the host computer 2 is actually a read-request or a write request, and, when the I/O requests are biased towards write requests, the same processing as when a write request is received in FIG. 17 is conducted with relation to whether the I/O request received from the host computer 2 is actually a read request or a write request.

For example, because the configuration register 644 is set to transfer the control packet by the same path as the transfer path of the user data packet when the I/O requests are biased towards read requests, in a case where a write request is received immediately after a read request has been received, the path transferring the user data read reply packet and the path transferring the control reply packet end up competing, but in a case where many read requests are received from a time when the first read request is received to a time until the processing of the read requests ends, the competition between the user data packets and the control packets including data becomes less overall. Also, here, the invention may be configured so that, in a case where the number of host I/Os does not exceed the threshold, processing is conducted with the current setting without conducting the processing of S50. Moreover, the host access statistical information 632 may be reset per fixed time, such as 1 minute, 10 minutes or 1 hour. This makes it possible to cope with the ever-changing state of I/O requests of the host computer 2.

Figure 19:
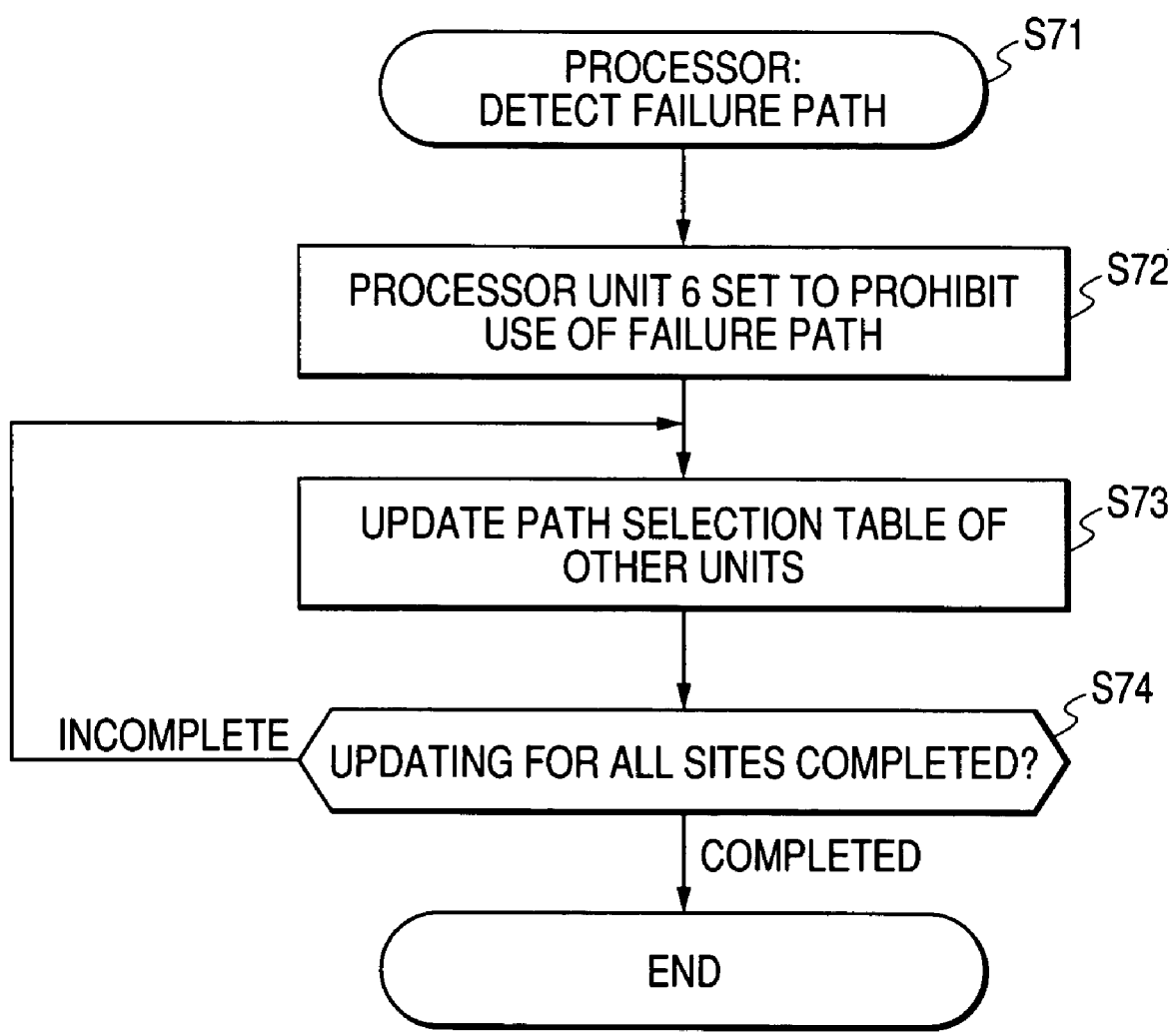
FIG. 19 is a flow chart showing an example of the processing of a processor when failure has occurred in a path.

Next, processing when a failure arises in one of the two inter-cluster paths 11A and 11B will be described in accordance with the flow chart shown in FIG. 19.

When a failure arises in one of the two inter-cluster paths 11A and 11B, the processor 61 of the processor unit 6 detects the fact that a failure has arisen in the inter-cluster path to which a reply packet is supposed to be sent when, for example, there is no reply packet reply with respect to a request packet for a period of time (S71). Normally, because the inter-cluster path to which the reply packet is to be sent is a different inter-cluster path from the inter-cluster path sending the request packet, the processor 61 also recognizes the inter-cluster path to which the reply packet is to be sent due to the fact that it recognizes the inter-cluster path sending the request packet.

When the processor 61 detects that a failure has arisen in one of the inter-cluster paths, the processor 61 sets the configuration register 644 of the path selecting unit 643 to not use the inter-cluster path in which the failure has arisen (S72). Next, the processor 61 updates the path selection tables 835 of the channel control unit 4, the disk control unit 5 and the shared memory unit 8 so that the path number in which the failure has arisen disappears from the control reply packet path number 835*b*. For example, the processor 61 updates this column so that it is the same as the corresponding control request packet path number 835*a* (S73). Then, the processor 61 repeats the processing of S73 until all sites have been updated (S74).

As described above, in the present embodiment, by effectively using the inter-cluster paths, even if the number of inter-cluster paths is few, a balance in both an improvement of user data access through-put performance and an improvement of control access through-put performance can be achieved. Moreover, even if a failure arises in one of the inter-cluster paths, reliability and usability availability can be ensured because specification of the failure path and blockage of the failure path are possible.

Figure 20A:
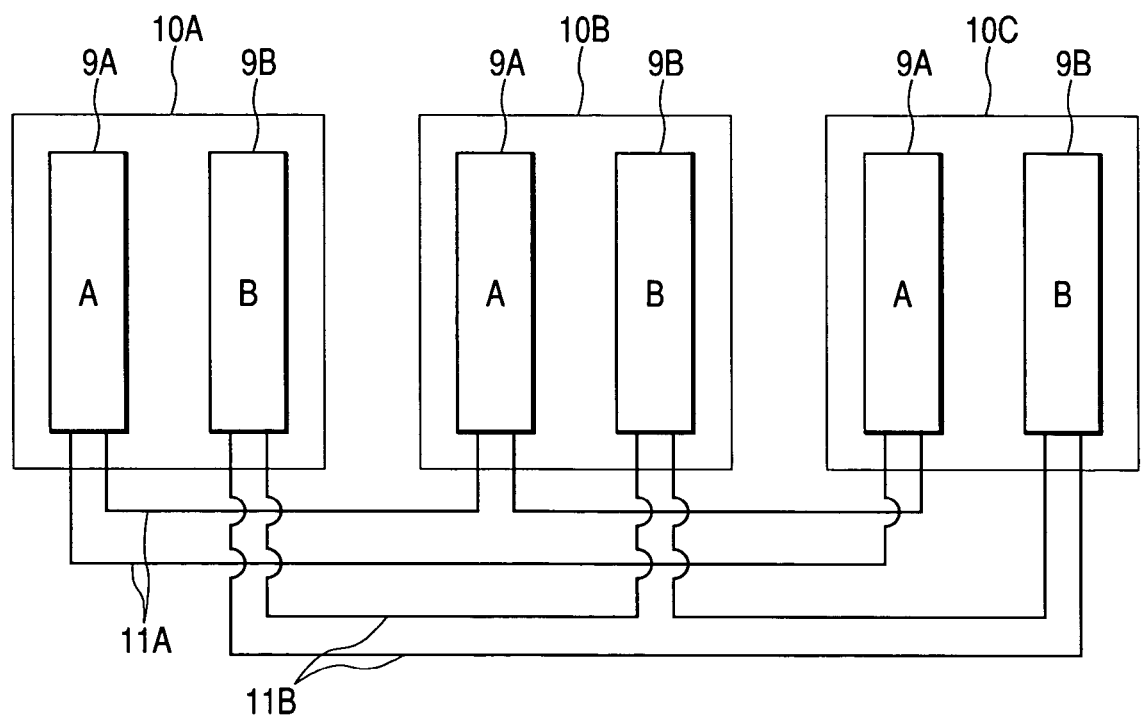
FIGS. 20A and 20B are diagrams showing the interconnected state of clusters in accordance with another embodiment.
Figure 20B:
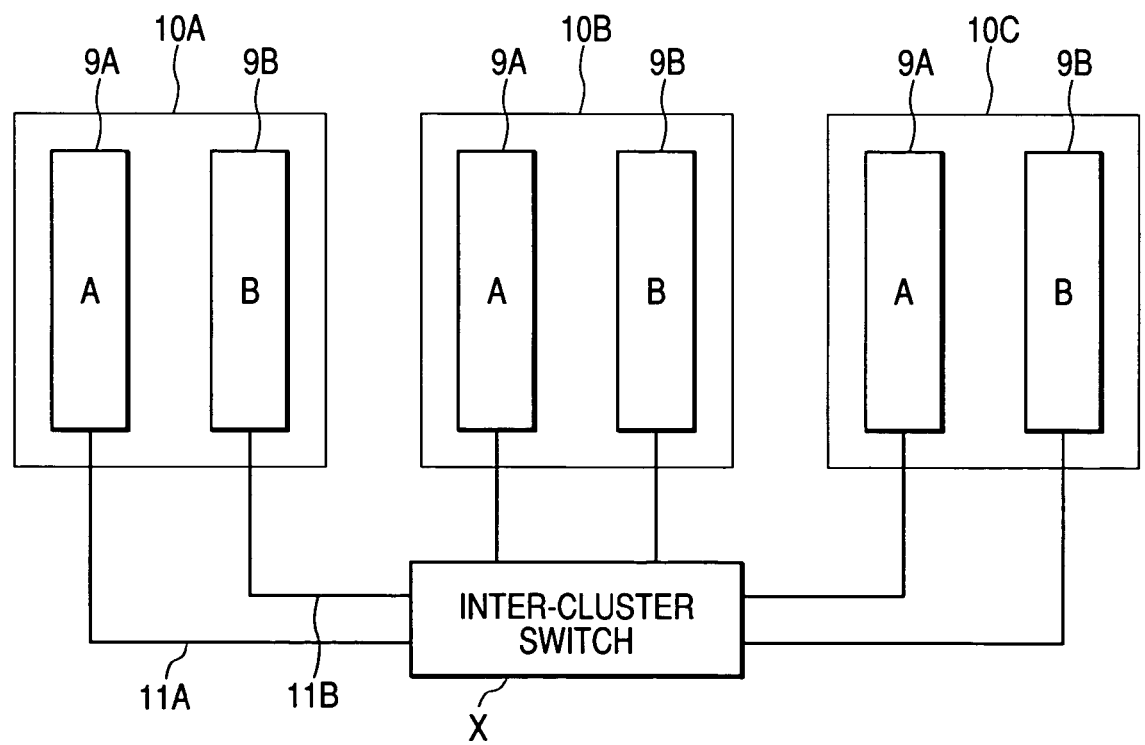

In the preceding embodiment, an example was described where the storage controller 1 was disposed with two clusters 10A and 10B, but it goes without saying that the invention can be applied even when the storage controller 1 is disposed with three or more clusters. In this case, as shown in FIG. 20A, two inter-cluster paths 11A and 11B are disposed between clusters 10A, 10B and 10C. Also, as shown in FIG. 20B, an inter-cluster switch X may be disposed so that the two inter-cluster paths 11A and 11B are connected to the inter-cluster switch X from each cluster. Because two or more inter-cluster paths 11A and two or more inter-cluster paths 11B are connected, it is necessary for the internal switch units 9A and 9B of FIG. 20A and the inter-cluster switch X of FIG. 20B to reference the request destination address 135 or the reply destination address 137 to determine to which of the clusters 10A, 10B and 10C to transfer packets. In FIG. 20B, the inter-cluster switch X transfers packets using the inter-cluster paths 11A and 11B connected to the transfer destination cluster, which belong to the same path group (in this case, A or B) of the same system (in this case, A or B) as the inter-cluster path to which the packet has been transferred from the inter-cluster switch X.

According to the present invention, because the inter-cluster paths can be effectively used so that the user data packets and the control packets do not compete, a balance in both an improvement of user data access through-put performance and an improvement of control access through-put performance can be achieved even with a few number of inter-cluster paths, and the manufacturing costs can be prevented from rising.

What is claimed is:

1. A storage system comprising:
a controller including plural clusters;

a storage device connected to the plural clusters; and
communication lines that interconnect the plural clusters,
wherein the communication lines are configured by plural full-duplex communicable paths, and
when the plural clusters read or write data that is to be stored or is stored in the storage device in response to a predetermined condition, the plural clusters select, as the path to be used for the transfer of a control packet to another cluster, a path that is different from the path used for the transfer of a user data packet,
wherein the predetermined condition is a condition where the path to be used for the transfer of the user data packet is being used for the writing of the data to the storage device connected to the other cluster.

2. The storage system of claim 1, wherein when the other cluster receives the control packet, the other cluster selects, from the plural paths, a path that is different from the path used for the reception of the control packet and transmits, to the cluster that had transmitted the control packet, a reply packet corresponding to the control packet.

3. The storage system of claim 2, wherein when the plural clusters read or write data that is to be stored or is stored in the storage device in response to a second predetermined condition, the plural clusters select, as the path to be used for the transfer of a control packet to another cluster, a path that is the same as the path used for the transfer of a user data packet.

4. The storage system of claim 2, wherein the plural clusters determine whether the user data packet to be transmitted to the other cluster is a packet for reading data from the storage device connected to the other cluster or a packet for writing data to the storage device, record the determination result, and determine a use tendency of each of the plural paths from the determination result.

5. The storage system of claim 4, wherein the predetermined condition is a condition where the use tendency is such that the frequency with which the path to be used for the transfer of the user data packet is used for the writing of the data to the storage device connected to the other cluster is high.

6. An inter-cluster data communication method in a storage system for which a storage device is disposed and which is disposed with plural clusters that control the storage device, the method comprising:
interconnecting the plural clusters with plural paths;
a cluster of the plural clusters that transfers a packet to another cluster selecting, from the plural paths, a path that satisfies a predetermined condition;
at least one cluster transferring a control packet to the other cluster using the path that satisfies the predetermined condition; and
when the other cluster receives the control packet, the other cluster transmitting a reply with respect to the received control packet using a path that is different from the path used to receive the control packet,
wherein the predetermined condition is a condition where the path using frequency used for the transfer of a user data packet for reading data from the storage device connected to the other cluster is high.

7. The inter-cluster data communication method of claim 6, wherein when the plural clusters read or write data that is to be stored or is stored in the storage device in response to the predetermined condition, the plural clusters select, as the path to be used for the transfer of the control packet to the other cluster, a path that is different from the path used for the transfer of a user data packet.

8. A machine-readable storage medium having a program embodied thereon, the program for use within a storage system including:
a controller including plural clusters;
a storage device connected to the plural clusters; and
communication lines that interconnect the plural clusters,
wherein the communication lines are configured by plural full-duplex communicable paths, and
the program, when run, causes operations wherein, when the plural clusters read or write data that is to be stored or is stored in the storage device in response to a predetermined condition, the plural clusters select, as the path to be used for the transfer of a control packet to another cluster, a path that is different from the path used for the transfer of a user data packet,
wherein the predetermined condition is a condition where the path to be used for the transfer of the user data packet is being used for the writing of the data to the storage device connected to the other cluster.

9. The machine-readable storage medium of claim 8, which, when run, causes operations wherein: when the other cluster receives the control packet, the other cluster selects, from the plural paths, a path that is different from the path used for the reception of the control packet and transmits, to the cluster that had transmitted the control packet, a reply packet corresponding to the control packet.

10. The machine-readable storage medium of claim 9, which, when run, causes operations wherein: the plural clusters determine whether the user data packet to be transmitted to the other cluster is a packet for reading data from the storage device connected to the other cluster or a packet for writing data to the storage device, record the determination result, and determine a use tendency of each of the plural paths from the determination result.

11. The machine-readable storage medium of claim 10, wherein the predetermined condition is a condition where the use tendency is such that the frequency with which the path to be used for the transfer of the user data packet is used for the writing of the data to the storage device connected to the other cluster is high.

* * * * *